US012748642B2

(12) United States Patent
Suo et al.

(10) Patent No.: US 12,748,642 B2
(45) Date of Patent: Sep. 29, 2026

(54) CROSS-CHAIN COLLABORATIVE GOVERNANCE SYSTEM, METHOD AND DEVICE AND STORAGE MEDIUM

(71) Applicant: TENCENT TECHNOLOGY (SHENZHEN) COMPANY LIMITED, Shenzhen (CN)

(72) Inventors: Yanming Suo, Shenzhen (CN); Zixi Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 972 days.

(21) Appl. No.: 17/970,983

(22) Filed: Oct. 21, 2022

(65) Prior Publication Data

US 2023/0039643 A1 Feb. 9, 2023

Related U.S. Application Data

(63) Continuation of application No. PCT/CN2022/070048, filed on Jan. 4, 2022.

(30) Foreign Application Priority Data

Jan. 12, 2021 (CN) ......................... 202110039495.9

(51) Int. Cl.
*G06F 9/54* (2006.01)
*G06Q 50/26* (2024.01)

(52) U.S. Cl.
CPC ............. *G06F 9/546* (2013.01); *G06Q 50/26* (2013.01)

(58) Field of Classification Search
None
See application file for complete search history.

(56) References Cited

U.S. PATENT DOCUMENTS 10,878,052 B2 * 12/2020 Lu ......................... H04L 9/3239
2018/0294955 A1 * 10/2018 Rhie ................... G06F 16/2272
(Continued)

FOREIGN PATENT DOCUMENTS

CN 111158703 A 5/2020
CN 111612615 A * 9/2020 ............. H04L 67/10
(Continued)

OTHER PUBLICATIONS

The World Intellectual Property Organization (WIPO) International Search Report for PCT/CN2022/070048 Apr. 1, 2022 6 Pages (including translation).

*Primary Examiner* — Charles E Anya
(74) *Attorney, Agent, or Firm* — Anova Law Group, PLLC

(57) ABSTRACT

A cross-chain collaborative governance system is configured to perform collaborative service and control governance on cross-chain interoperation between application subchains in a cross-chain alliance. The cross-chain collaborative governance system includes: a cross-chain access application layer configured to make a first application subchain and a second application subchain access the cross-chain collaborative governance system; a credible cross-chain collaborative layer configured to provide collaborative service for cross-chain interoperation between the first application subchain and the second application subchain; and a credible cross-chain governance layer configured to perform control governance on the cross-chain interoperation between the first application subchain and the second application subchain.

20 Claims, 12 Drawing Sheets

(56) References Cited

U.S. PATENT DOCUMENTS

| | | | | |
|---|---|---|---|---|
| 2019/0034459 | A1* | 1/2019 | Qiu | H04L 9/3265 |
| 2020/0007315 | A1* | 1/2020 | Vouk | H04L 9/0637 |
| 2020/0120019 | A1* | 4/2020 | Chen | H04L 45/44 |
| 2020/0167319 | A1 | 5/2020 | Fritz et al. | |
| 2020/0177391 | A1* | 6/2020 | Qiu | H04L 9/3239 |
| 2020/0177572 | A1* | 6/2020 | Qui | G06F 16/2379 |
| 2020/0294165 | A1* | 9/2020 | Yang | G06F 21/64 |
| 2021/0160252 | A1* | 5/2021 | Qiu | H04L 67/565 |

FOREIGN PATENT DOCUMENTS

| | | | | | |
|---|---|---|---|---|---|
| CN | 111666323 | A | * | 9/2020 | G06F 16/27 |
| CN | 111931215 | A | | 11/2020 | |
| CN | 112055002 | A | | 12/2020 | |
| CN | 112104685 | A | * | 12/2020 | H04L 63/08 |
| WO | WO-2019120336 | A2 | * | 6/2019 | H04L 9/3234 |
| WO | WO 2020001370 | A1 | * | 1/2020 | G06Q 20/403 |
| WO | WO-2020098835 | A2 | * | 5/2020 | H04L 9/50 |

* cited by examiner

CROSS-CHAIN COLLABORATIVE GOVERNANCE SYSTEM, METHOD AND DEVICE AND STORAGE MEDIUM

CROSS-REFERENCES TO RELATED APPLICATIONS

This application is a continuation application of PCT Patent Application No. PCT/CN2022/070048, entitled "CROSS-CHAIN COLLABORATIVE GOVERNANCE SYSTEM AND METHOD, AND DEVICE AND STORAGE MEDIUM" and filed on Jan. 4, 2022, which claims priority to Chinese Patent Application No. 202110039495.9, entitled "CROSS-CHAIN COLLABORATIVE GOVERNANCE SYSTEM, METHOD AND DEVICE AND STORAGE MEDIUM" and filed with the China National Intellectual Property Administration, on Jan. 12, 2021, the entire contents of both of which are incorporated herein by reference.

FIELD OF THE TECHNOLOGY

The present disclosure relates to the technical field of blockchains, in particular to a cross-chain collaborative governance technology.

BACKGROUND OF THE DISCLOSURE

With accelerated development of industry blockchains, a blockchain technology is gradually applied to many fields such as government administrative service, administration of justice, tracing, medical treatment and energy and has a remarkable achievement, and how to achieve cross-chain interoperation between application subchains under different application scenarios is a technical problem urgently needing to be solved while the industry blockchains are rapidly developed. Cross-chain interoperation means connectivity between the application subchains and enables data to be securely and credibly transferred between the application sub chains.

At present, cross-chain interoperation between the application subchains can be achieved through technologies such as Notary Schemes, Sidechains, Relays and Hash-Locking. But, cross-chain interoperation achieved through the above several technologies is low in execution efficiency and execution speed, which hardly meets demands for cross-chain interoperation on mass of data under the industry blockchain scenario.

SUMMARY

The embodiments of the present disclosure provide a cross-chain collaborative governance system, method and device and a storage medium, which can effectively improve execution efficiency of cross-chain interoperation between application subchains.

In the first aspect, an embodiment of the present disclosure provides a cross-chain collaborative governance system for collaborative service and control governance on cross-chain interoperation between the application subchains in a cross-chain alliance; the cross-chain alliance includes a first application subchain arranged in a first blockchain network and a second application subchain arranged in a second blockchain network; the cross-chain collaborative governance system includes: a cross-chain access application layer configured to provide the first application subchain and the second application subchain with access to the cross-chain collaborative governance system; a credible cross-chain collaborative layer configured to deploy a first collaborative service program in the first blockchain network and a second collaborative service program in the second blockchain network, and establish communication connection between the first collaborative service program and the second collaborative service program that facilitates cross-chain interoperation between the first application subchain and the second application subchain; and a credible cross-chain governance layer configured to operate a governance chain comprising a first governance node associated with the first application subchain and a second governance node associated with the second application subchain, and establish communication connection between the first collaborative service program and the first governance node and communication connection between the second collaborative service program and the second governance node, and perform control governance on the cross-chain interoperation between the first application subchain and the second application subchain.

In the embodiments of the present disclosure, the cross-chain collaborative governance system includes the cross-chain access application layer, the credible cross-chain collaborative layer and the credible cross-chain governance layer. The credible cross-chain collaborative layer may establish the communication connection between the first collaborative service program and the second collaborative service program so as to facilitate the cross-chain interoperation between the first application subchain and the second application subchain; the first collaborative service program is deployed, by the credible cross-chain collaborative layer, in the first blockchain network, and the first application subchain is arranged in the first blockchain network; and the second collaborative service program is deployed, by the credible cross-chain collaborative layer, in the second blockchain network, and the second application subchain is arranged in the first blockchain network. The credible cross-chain governance layer may establish the communication connection between the first collaborative service program and the first governance node and communication connection between the second collaborative service program and the second governance node so as to perform control governance on the cross-chain interoperation between the first application subchain and the second application subchain based on the first governance node and the second governance node in the governance chain; and the first governance node is associated with the first application subchain, and the second governance node is associated with the second application subchain. The credible cross-chain collaborative layer provides collaborative service for the cross-chain interoperation between the application subchains in the cross-chain alliance, and the credible cross-chain governance layer performs the control governance on the cross-chain interoperation between the application subchains in the cross-chain alliance, which can effectively improve execution efficiency of the cross-chain interoperation between the application subchains (such as the first application subchain and the second application subchain) in the cross-chain alliance.

In the second aspect, an embodiment of the present disclosure further provides a cross-chain collaborative governance method applied to the cross-chain collaborative governance system in the first aspect, and the cross-chain collaborative governance method includes: providing a first application subchain and a second application subchain with access to the cross-chain collaborative governance system; the first application subchain being arranged in a first blockchain network and the second application subchain being arranged in a second blockchain network in a cross-chain alliance;

constructing a first governance node associated with the first application subchain in a governance chain and a second governance node associated with the second application subchain in the governance chain; deploying a first collaborative service program in the first blockchain network and a second collaborative service program in the second blockchain network; establishing communication connection between the first collaborative service program and the second collaborative service program, and performing cross-chain interoperation between the first application subchain and the second application subchain; establishing communication connection between the first collaborative service program and the first governance node and communication connection between the second collaborative service program and the second governance node; and performing control governance on the cross-chain interoperation between the first application subchain and the second application subchain.

In the embodiments of the present disclosure, after the first application subchain (arranged in the first blockchain network) and the second application subchain (arranged in the second blockchain network) in the cross-chain alliance have access to the cross-chain collaborative governance system, the first governance node associated with the first application subchain and the second governance node associated with the second application subchain need to be constructed in the governance chain, the first collaborative service program needs to be deployed in the first blockchain network, and the second collaborative service program needs to be deployed in the second blockchain network; the communication connection between the first collaborative service program and the second collaborative service program, the communication connection between the first collaborative service program and the first governance node and the communication connection between the second collaborative service program and the second governance node also need to be established; accordingly, the cross-chain interoperation is performed between the first application subchain and the second application subchain based on the mutual communication between the first collaborative service program and the second collaborative service program; and the control governance is performed on the cross-chain interoperation between the first application subchain and the second application subchain based on the mutual communication between the first collaborative service program and the first governance node and the mutual communication between the second collaborative service program and the second governance node. It can be known from the above solution that the cross-chain interoperation between the application subchains (such as the first application subchain and the second application subchain) in the cross-chain alliance can be achieved through the mutual communication between the collaborative service programs corresponding to the application subchains, and the control governance performed, by the governance nodes in the governance chain, on the cross-chain interoperation between the application subchains (such as the first application subchain and the second application subchain) in the cross-chain alliance can effectively improve the execution efficiency of the cross-chain interoperation between the application subchains.

In the third aspect, an embodiment of the present disclosure provides a cross-chain collaborative governance device, wherein the cross-chain collaborative governance system in the first aspect is deployed in the cross-chain collaborative governance device, and the cross-chain collaborative governance system is configured to execute the cross-chain collaborative governance method in the second aspect.

In the fourth aspect, an embodiment of the present disclosure provides a non-transitory computer-readable storage medium storing computer programs, and when the computer programs are read and executed by a processor of a computer device, the computer device is enabled to execute the cross-chain collaborative governance method in the second aspect.

DESCRIPTION OF EMBODIMENTS

The embodiments of the present disclosure relate to a blockchain network. The blockchain network may be a distributed system formed by connecting a client to a plurality of nodes (computing devices in any form in an access network, such as, servers and user terminals) in a network communication form.

Figure 1:
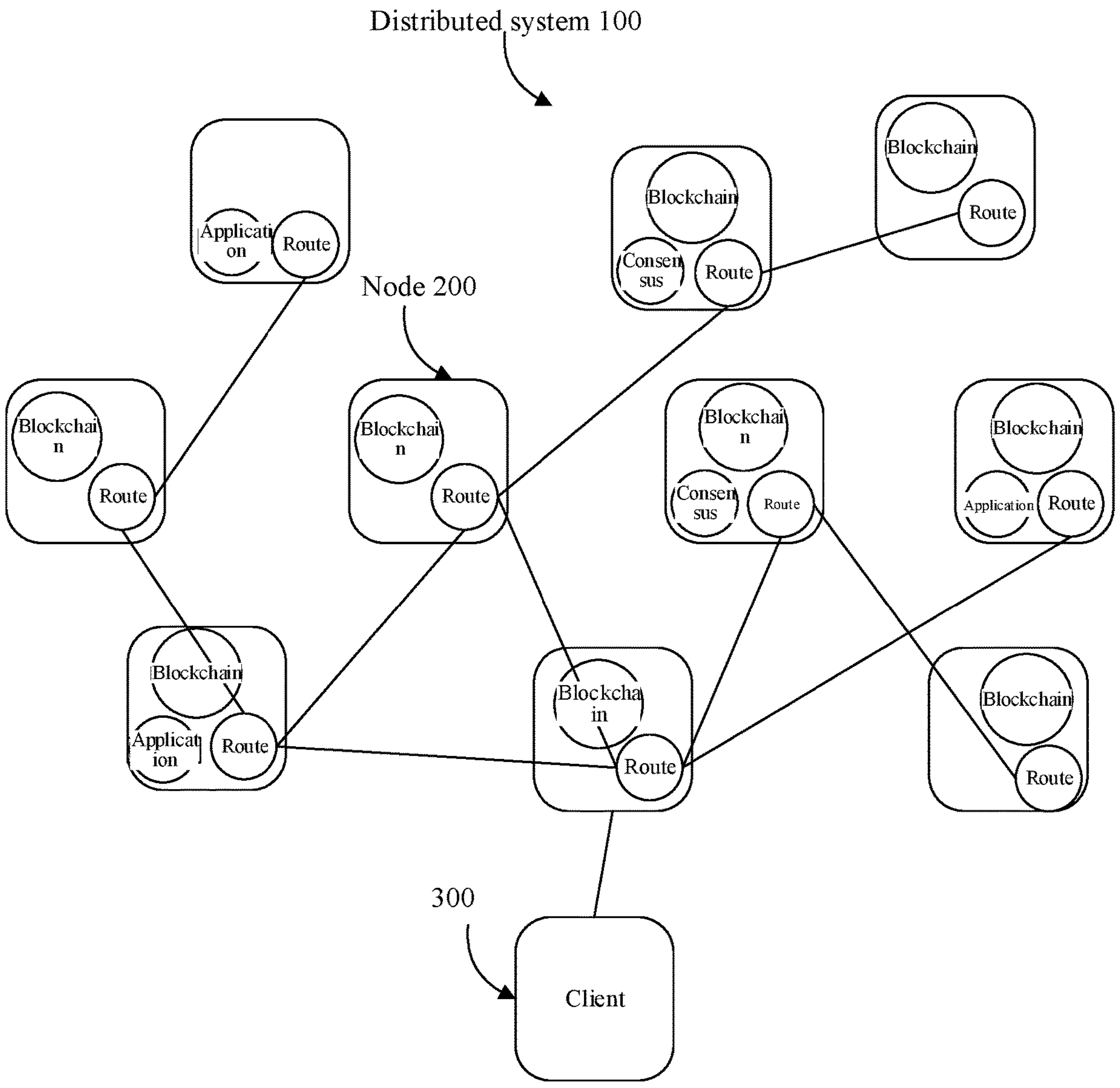
FIG. 1 is a schematic structural diagram of a blockchain network according to an embodiment of the present disclosure.

FIG. 1 is a schematic structural diagram of a blockchain network according to an exemplary embodiment of the present disclosure. The blockchain network 100 (or distributed system 100) is formed of a plurality of nodes (computing devices in any form in an access network, such as, servers and user terminals) and a client. A peer-to-peer (P2P) network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer.

Referring to functions of each node in the blockchain network shown in FIG. 1, the related functions may include the following:

(1) Routing: which is a basic function of a node, and is used for supporting communication between nodes.

(2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain network, so that the another node adds the recorded data to a temporary block when successfully verifying a source and integrity of the recorded data.

For example, services implemented by the application include:

① Wallet: used for providing a transaction function with electronic money, including transaction initiation (that is, a transaction record of a current transaction is transmitted to another node in the blockchain network, and the another node stores, after successfully verifying the transaction record, recorded data of the transaction to a temporary block in a blockchain in response to admitting that the transaction is valid); and certainly, the wallet may support inquiry about remaining electronic money in an electronic money address.

② Shared ledger: used for providing functions of operations such as storage, query, and modification of account data. Recorded data of the operations on the account data is transmitted to another node in the blockchain network. The another node stores, after verifying that the account data is valid, the recorded data to a temporary block in response to admitting that the account data is valid, and may further transmit an acknowledgement to a node initiating the operations.

③ Smart contract, which is a computerized protocol capable of executing terms of a certain contract. The smart contract is achieved by codes deployed on a share ledger and executed in response to meeting a certain condition, and finishes automatic transactions according to practical business need codes; and that is, the smart contract is an executable program running on the blockchain and is automatically executed when transactions are performed on the blockchain. For example, a logistics state of a commodity purchased by a buyer is inquired, and electronic money of the buyer is transferred to a seller address after the buyer signs for the commodity; and certainly, the smart contract is not limited to execute the contract for transactions, and may also execute contracts for processing received messages.

④ Blockchain: which includes a series of blocks that are consecutive in a chronological order of generation. Once a new block is added to the blockchain, the new block is no longer removed. The block records recorded data submitted by the node in the blockchain network.

A blockchain is a new application model of computer technologies such as distributed data storage, point-to-point transmission, a consensus mechanism, and an encryption algorithm. The blockchain is essentially a decentralized database, and as an underlying technology of Bitcoin, is a string of data blocks generated through cryptology association, the data blocks are chained through a random hashing algorithm (also referred to as a hash algorithm), and a rear block includes a hash value of a previous block. The blockchain technology is widely applied in scenarios such as digital asset, smart contract, logistics tracking and product protection.

Figure 2:
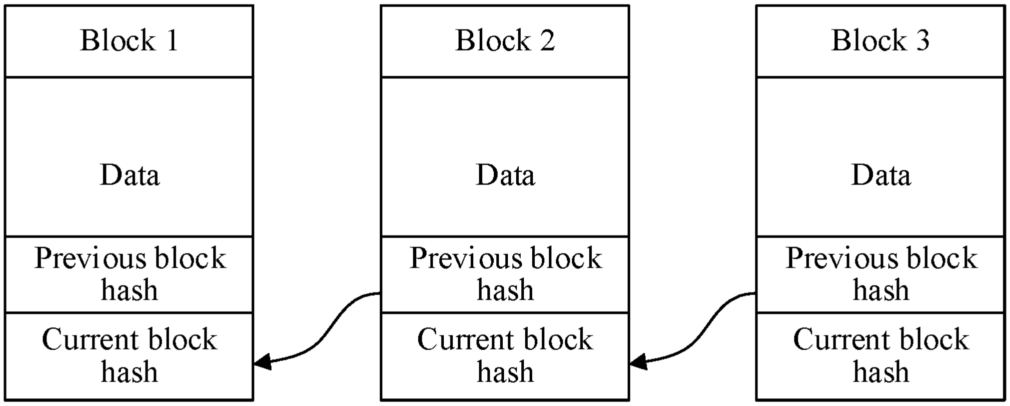
FIG. 2 is a schematic diagram of a block structure according to an embodiment of the present disclosure.

FIG. 2 is a schematic diagram of a block structure according to an exemplary embodiment of the present disclosure. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is essentially a decentralized database, and is a string of associated data blocks generated by using a cryptology method. Each data block includes related information used for verifying the validity (anti-counterfeiting) of information of the data block and generating a next block.

An embodiment of the present disclosure provides a cross-chain collaborative governance system also named as a Cross-Chain Collaborative Governance Platform (CCGP), which provides a "chain-govern-chain" cross-chain interoperation mode; the "chain-govern-chain" cross-chain interoperation mode means that a governance chain in the cross-chain collaborative governance system performs all-process control and governance on cross-chain interoperation between application subchains in a cross-chain alliance; the cross-chain interoperation means that the application subchains in the cross-chain alliance can be interconnected to enable data to be securely and credibly transferred between the application subchains; management organizations of the application subchains in the cross-chain alliance are governance nodes in a governance chain including a plurality of governance nodes, and the management organizations of the application subchains in the cross-chain alliance participate in cross-chain governance through the governance chain; and the cross-chain collaborative governance system can effectively improve the execution efficiency of the cross-chain interoperation between the application subchains in the cross-chain alliance through the "chain-govern-chain" cross-chain interoperation mode.

Figure 3:
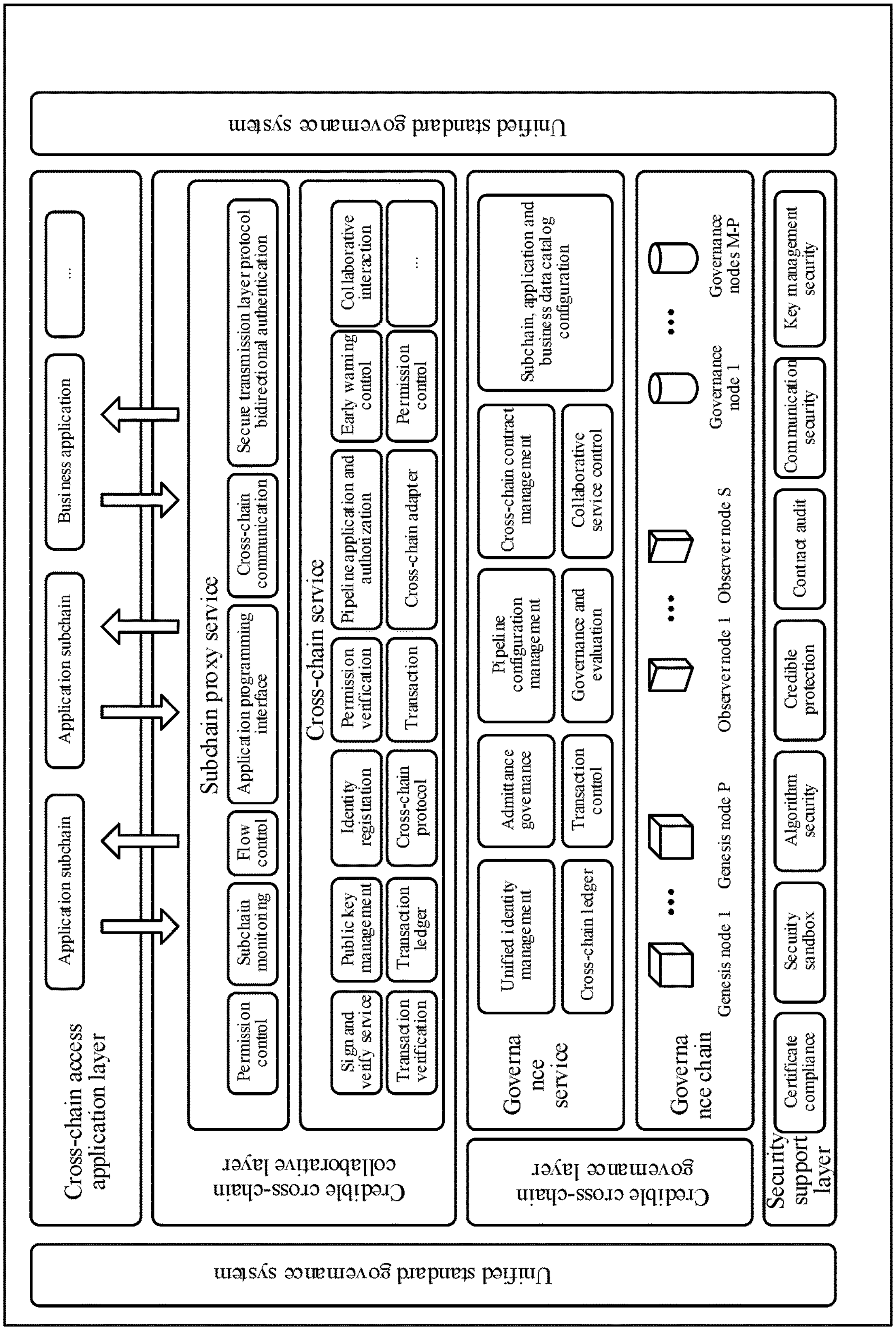
FIG. 3 is a schematic architectural diagram of a cross-chain collaborative governance system according to an embodiment of the present disclosure.

FIG. 3 shows a schematic architectural diagram of a cross-chain collaborative governance system according to an embodiment of the present disclosure, and the cross-chain collaborative governance system is configured to perform collaborative service and control governance on cross-chain interoperation between application subchains in a cross-chain alliance. As shown in FIG. 3, the cross-chain collaborative governance system includes a cross-chain access application layer, a credible cross-chain collaborative layer, a credible cross-chain governance layer and a security support layer, and various layers of the cross-chain collaborative governance system are introduced one by one as below:

(1) Cross-Chain Access Application Layer

① The cross-chain access application layer of the cross-chain collaborative governance system is configured to make the application subchains in the cross-chain alliance access the cross-chain collaborative governance system. The cross-chain alliance may include N application subchains, wherein N is an integer greater than 1; taking the cross-chain alliance including a first application subchain and a second application subchain as an example, the first application subchain is any one in the cross-chain alliance, and the second application subchain is any one, except the first application subchain, in the cross-chain alliance; and the cross-chain access application layer may be configured to make the first application subchain and the second application subchain access the cross-chain collaborative governance system.

The application subchains refer to blockchains constructed based on the blockchain technology under various scenarios (such as judicial evidence storage, tracing, intellectual property protection and government affair big data). The application subchains may belong to a public blockchain, or a private blockchain or a consortium blockchain. The public blockchain is a blockchain, without an authorization mechanism, open in a belonging blockchain network. The private blockchain is a blockchain with all nodes grasped by one organization in a belonging blockchain network. The consortium blockchain means that a plurality of pre-selected nodes are assigned as bookkeepers in members of a specific group (such as members of a certain organization or several organizations) and a limited third side, and generation of each block in the consortium blockchain is jointly decided by all the pre-selected nodes. Taking the application subchains belonging to the consortium blockchain as an example in the embodiments of the present disclosure, one application subchain may correspond to one management organization (for example, the management organization may be an organization that corresponds to any one of the plurality of pre-selected nodes), and one management organization may manage the plurality of application subchains.

The cross-chain alliance is an alliance that includes N application subchains, and the application subchains in the cross-chain alliance may achieve cross-chain interoperation through the cross-chain collaborative governance system; and meanwhile, the cross-chain collaborative governance system provides collaborative service for the cross-chain interoperation between the application subchains in the cross-chain alliance, and performs control governance on the cross-chain interoperation between the application subchains in the cross-chain alliance. The application subchains in the cross-chain alliance may be isomorphic chains and may also be heterogeneous chains. The plurality of application subchains that are each other's isomorphic chains may be constructed by the same blockchain technology. For example, the plurality of application subchains that are each other's isomorphic chains may adopt the same consensus mechanism and the same block verification mode and have the same block data structure; and taking the first application subchain and the second application subchain as an example, if the first application subchain and the second application subchain are each other's isomorphic chains, the first application subchain and the second application subchain adopt the same consensus mechanism for performing block consensus and adopt the same block verification mode for block verification, and the first application subchain and the second application subchain are the same in block data structure. The plurality of application subchains that are each other's heterogeneous chains may be constructed by different blockchain technologies. For example, the plurality of application subchains that are each other's heterogeneous chains adopt different consensus mechanisms or different block verification modes or have different block data structures; and taking the first application subchain and the second application subchain as an example, if the first application subchain and the second application subchain are each other's heterogeneous chains, the first application subchain adopts a first consensus mechanism for performing block consensus, the second application subchain adopts a second consensus mechanism for performing block consensus, the first application subchain adopts a first block verification mode for block verification, the second application subchain adopts a second block verification mode for block verification, a block data structure in the first application subchain is a first structure, a block data structure in the second application subchain is a second structure, the first consensus mechanism is different from the second consensus mechanism, the first block verification mode is different from the second block verification mode, and the first structure is different from the second structure. The cross-chain collaborative governance system provides a standard access channel for the application subchains that are each other's isomorphic chains and the application subchains that are each other's heterogeneous chains. That is, both the application subchains that are each other's isomorphic chains and the application subchains that are each other's heterogeneous chains can access to the standard access channel so that the cross-chain collaborative governance system has universality and is very easy to expand.

② The cross-chain access application layer of the cross-chain collaborative governance system may be further configured to connect business applications in blockchain networks to which the application subchains belong in the cross-chain alliance to the cross-chain collaborative governance system. Specifically, the cross-chain access application layer may connect one or more business applications in the belonging blockchain networks of the application subchains in the cross-chain alliance to the cross-chain collaborative governance system; taking the cross-chain alliance including the first application subchain and the second application subchain as an example, the cross-chain access application layer may connect a first business application in a first blockchain network to which the first application subchain belongs to the cross-chain collaborative governance system and may also connect a second business application in a second blockchain network to which the second application subchain belongs to the cross-chain collaborative governance system; and the business applications in the blockchain networks to which the application subchains belong may specifically Decentralized applications (Dapps).

The business applications in the blockchain networks to which the application subchains belong in the cross-chain alliance may also initiate cross-chain interoperation. In other words, the cross-chain interoperation in the embodiments of the present disclosure may include two situations: one is cross-chain interoperation between application subchains, namely cross-chain interoperation between two application subchains in a cross-chain alliance (such as cross-chain interoperation between a first application subchain and a second application subchain); and the other one is cross-chain interoperation between a business application and an application subchain, namely cross-chain interoperation between a business application in a blockchain network to which an application subchain belong in a cross-chain alliance and the other application subchain in the cross-chain alliance (such as cross-chain interoperation between a first business application in a first blockchain network to which a first application subchain belong and a second application subchain).

(2) Credible Cross-Chain Collaborative Layer

The credible cross-chain collaborative layer of the cross-chain collaborative governance system is configured to provide collaborative service for cross-chain interoperation between the application subchains in the cross-chain alliance.

① The credible cross-chain collaborative layer may be configured to deploy collaborative service programs for the application subchains in the cross-chain alliance. Taking the cross-chain alliance including a first application subchain and a second application subchain as an example, the first application subchain belongs to a first blockchain network (namely, the first application subchain is arranged in the first blockchain network), and the second application subchain belongs to a second blockchain network (namely, the second application subchain is arranged in the second blockchain network); and the credible cross-chain collaborative layer is configured to deploy a first collaborative service program in the first blockchain network and a second collaborative service program in the second blockchain network. The first blockchain network to which the first application subchain belongs having access to the cross-chain collaborative governance system and the second blockchain network to which the second application subchain belongs having access to the cross-chain collaborative governance system may have different networking topology models. That is, the first blockchain network and the second blockchain network may have different networking topology models, and the cross-chain collaborative governance system may support different networking topology models, so that the cross-chain collaborative governance system has universality and is very easy to expand.

The deploying, by the credible cross-chain collaborative layer, the first collaborative service program in the first blockchain network specifically may mean: under the situation that the first blockchain network includes a first service device, the credible cross-chain collaborative layer may deploy the first collaborative service program in the first service device and indicates the first service device to configure parameters of the first application subchain in the first collaborative service program; the parameters of the first application subchain may include but not limited to organization information of the management organization of the first application subchain, subchain information of the first application subchain, etc.; and the management organization of the first application subchain may log in the first collaborative service program through the first service device, for example, the cross-chain collaborative governance system may provide a cross-chain collaborative governance interface, and an administrator of the management organization of the first application subchain may input first account information in the cross-chain collaborative governance interface displayed on the first service device to log in the first collaborative service program.

The deploying, by the credible cross-chain collaborative layer, the second collaborative service program in the second blockchain network specifically may mean: under the situation that the second blockchain network includes a second service device, the credible cross-chain collaborative layer may deploy the second collaborative service program in the second service device and indicates the second service device to configure parameters of the second application subchain in the second collaborative service program; the parameters of the second application subchain may include but not limited to organization information of the management organization of the second application subchain, subchain information of the second application subchain, etc.; and the management organization of the second application subchain may log in the second collaborative service program through the second service device, for example, the cross-chain collaborative governance system may provide a cross-chain collaborative governance interface, and an administrator of the management organization of the second application subchain may input second account information in the cross-chain collaborative governance interface displayed on the second service device to log in the second collaborative service program.

It is to be explained that the service devices in the blockchain networks may be servers or service cluster devices which are deployed in the blockchain networks and are independent of the application subchains in the blockchain networks; for example, the first service device refers to a server independent of the first application subchain in the first blockchain network, and communicates with the first application subchain through the first collaborative service program deployed on the first service device; and for another example, the second service device refers to a server independent of the second application subchain in the second blockchain network, and communicates with the second application subchain through the second collaborative service program deployed on the second service device.

② The credible cross-chain collaborative layer may provide collaborative service for cross-chain interoperation between the application subchains by managing the collaborative service programs deployed in the blockchain networks. Taking the cross-chain interoperation between the first application subchain and the second application subchain as an example, the credible cross-chain collaborative layer may provide collaborative service for the cross-chain interoperation between the first application subchain and the second application subchain by managing the first collaborative service program and the second collaborative service program. The credible cross-chain collaborative layer is configured to establish communication connection between the first collaborative service program and the second collaborative service program so as to facilitate the cross-chain interoperation between the first application subchain and the second application subchain.

The establishing communication connection between the first collaborative service program and the second collaborative service program specifically may mean that: a cross-chain protocol runs on the first collaborative service program and the second collaborative service program to enable the first collaborative service program to communicate with the second collaborative service program through the cross-chain protocol. Specifically, the credible cross-chain collaborative layer supports the mutual communication between the first collaborative service program and the second collaborative service program so as to collaborate with the first application subchain and the second application subchain to perform the cross-chain interoperation; in other words, the cross-chain interoperation between the first application subchain and the second application subchain is achieved through the mutual communication between the first collaborative service program and the second collaborative service program; and the first collaborative service program directly communicates with the second collaborative service program, which can effectively improve the execution efficiency of the cross-chain interoperation between the first application subchain and the second application subchain.

The first collaborative service program and the second collaborative service program may each include a cross-chain service interface, a subchain proxy service subprogram and a cross-chain interoperation engine. The cross-chain service interface is configured to receive a service request of cross-chain interoperation in a blockchain network to which the corresponding application subchain belongs. The subchain proxy service subprogram may be configured to monitor the service request of cross-chain interoperation on the corresponding application subchain; the subchain proxy service subprogram may be further configured to perform permission control on the corresponding application subchain; the subchain proxy service subprogram may be further configured to perform flow control on the corresponding application subchain; and the subchain proxy service subprogram may be further configured to perform Transport Layer Security (TLS) bidirectional authentication so as to perform authentication (such as authentication on a security certificate of the first collaborative service program and a security certificate of the second collaborative service program) on security certificates (such as a Certificate Authority (CA) certificate issued by CA) of two cross-chain sides.

The cross-chain interoperation engine may be configured to execute the cross-chain interoperation; the cross-chain interoperation executed by the cross-chain interoperation engine may include but not limited to: sign-and-verify service, public key management, identity register, permission authentication, pipeline application and authorization, early warning monitor, inter-collaboration interaction, transaction validation, ledger transaction, Authorized Multi-Stage Distributed Protocol (AMDP), a cross-chain adapter, permission control, etc.; and AMDP is a cross-chain protocol oriented to industry blocks, which covers permission validation, data integrity checking, cross-chain interoperation interactive process, etc. The cross-chain interoperation engine is configured to execute the cross-chain interoperation when the subchain proxy service subprogram monitors the existence of the service request of cross-chain interoperation on the corresponding application subchain; and for example, the cross-chain interoperation engine of the first collaborative service program may execute the cross-chain interoperation when the subchain proxy service subprogram of the first collaborative service program monitors the existence of the service request of cross-chain interoperation on the first application subchain. Or, the cross-chain interoperation engine is configured to execute the cross-chain interoperation when the cross-chain service interface receives a service request of cross-chain interoperation in a blockchain network to which the corresponding application subchain belongs, and the service request may be sent by a business application in the blockchain network to which the corresponding application subchain belongs; and for example, the cross-chain interoperation engine of the second collaborative service program may execute the cross-chain interoperation when the cross-chain service interface of the second collaborative service program receives the service request of cross-chain interoperation sent by a second business application in the second blockchain network to which the second application subchain belongs.

③ The credible cross-chain collaborative layer further supports the mutual communication between the first collaborative service program and a first governance node in the governance chain and the mutual communication between the second collaborative service program and a second governance node in the governance chain, the first governance node is associated with the first application subchain, and the second governance node is associated with the second application subchain. In other words, the first collaborative service program is a middle credible service connecting the first application subchain with the first governance node, and the second collaborative service program is a middle credible service connecting the second application subchain with the second governance node.

(3) Credible Cross-Chain Governance Layer

The credible cross-chain governance layer of the cross-chain collaborative governance system is configured to perform control governance on the cross-chain interoperation between the application subchains in the cross-chain alliance.

① The credible cross-chain governance layer may include the governance chain and may perform control governance on the cross-chain interoperation between the application subchains in the cross-chain alliance through the governance chain. The governance chain may include M governance nodes, the governance nodes are nodes that are constructed in the governance chain by the management organizations corresponding to the application subchains in the cross-chain alliance and all have permission in cross-chain governance, and M is an integer greater than 1. The management organizations of the application subchains in the cross-chain alliance all join in the governance chain, and the governance node are constructed in the governance chain and jointly participate in control governance on the cross-chain interoperation, such that the cross-chain collaborative governance system can achieve multi-side co-construction and multi-side co-governance. When there is a cross-chain interoperation business need in one application subchain (such as a third application subchain) in the cross-chain alliance, a management organization of the third application subchain may apply to join in the governance chain to become a third governance node in the governance chain to participate in control governance on cross-chain interoperation. According to permission division, M governance nodes in the governance chain may include P Genesis nodes and M-P ordinary governance nodes, wherein P is a positive integer, and is less than or equal to M. The ordinary governance nodes only have a permission in cross-chain governance; and the Genesis nodes not only have a permission in cross-chain governance, but also have a management permission for the governance chain. In addition, the permission in cross-chain governance includes but not limited to: a permission for unified identity management on two sides for cross-chain interoperation, a permission for admittance to governance, a permission for pipeline configuration management, a permission for cross-chain smart contract management, a permission for transaction control, a permission for governance and evaluation, a permission for collaborative service control, and other permissions related to the cross-chain interoperation. The management permission for the governance chain includes: a permission for establishing the governance chain, a permission for operating the governance chain, a permission for managing the ordinary governance nodes, etc. The governance chain may be at least collaboratively established by a plurality of (two or more, such as 4) Genesis organizations, and each Genesis organization establishes the Genesis nodes, perform networking and construct the governance chain. After the governance chain is constructed, the Genesis nodes initialize and operate the governance chain. The number of the Genesis nodes may be continuously increased in an operation process of the governance chain, for example, if a management organization corresponding to a certain Genesis node in the governance chain has a higher management permission, then the governance node can be determined as a Genesis node after all the Governance nodes vote through. In addition, the governance chain may further include S observer nodes, and S is a positive integer; the observer nodes neither have a management permission on the governance chain nor a permission in cross-chain governance, do not participate in block consensus of the governance chain, and only synchronize block information in the governance chain; and during practical application, the observer nodes may generally be nodes of an audit institution participating in the cross-chain governance.

One governance node in the governance chain corresponds to one management organization, and one management organization may manage one or more application subchains in the cross-chain alliance. That is, one governance node in the governance chain may be associated with one or more application subchains in the cross-chain alliance. The association of the governance node and the application subchains means that the governance node and the application subchains belong to the same management organization. For example, the first application subchain is associated with the first governance node in the governance chain, and the first governance node is a node of the management organization of the first application subchain participating in cross-chain governance; and the second application subchain is associated with the second governance node in the governance chain, and the second governance node is a node of the management organization of the second application subchain participating in cross-chain governance. The governance chain is a federated chain constructed based on the blockchain technology, the credible cross-chain governance layer performs control governance on cross-chain participants (namely, the application subchains in the cross-chain alliance, and the management organizations of the application subchains in the cross-chain alliance), cross-chain permissions, cross-chain transactions and cross-chain execution related to the cross-chain interoperation based on the governance chain. The credible cross-chain governance layer may be configured to establish communication connection between the first collaborative service program and the first governance node and communication connection between the second collaborative service program and the second governance node so as to perform control governance on the cross-chain interoperation between the first application subchain and the second application subchain; the establishing communication connection between the first collaborative service program and the first governance node specifically may mean that: the cross-chain protocol runs on the first collaborative service program and the first governance node to enable the first collaborative service program to communicate with the first governance node through the cross-chain protocol; and the establishing communication connection between the second collaborative service program and the second governance node specifically may mean that: the cross-chain protocol runs on the second collaborative service program and the second governance node to enable the second collaborative service program to communicate with the second governance node through the cross-chain protocol. The credible cross-chain collaborative layer may support the mutual communication between the first collaborative service program and the first governance node and the mutual communication between the second collaborative service program and the second governance node; and the credible cross-chain governance layer may perform control governance on the cross-chain interoperation between the first application subchain and the second application subchain based on the mutual communication between the first collaborative service program and the first governance node and the mutual communication between the second collaborative service program and the second governance node.

② The credible cross-chain governance layer may further include a governance service deployed in the governance chain in the form of smart contract; the governance service is a service support for the cross-chain collaborative governance system to perform control governance on the cross-chain interoperation between the application subchains in the cross-chain alliance, and the governance service may include but not limited to: unified identity management, admittance governance, pipeline configuration management, cross-chain contract management, a cross-chain ledger, transaction control, governance and evaluation, collaborative service control, and catalog configuration of the application subchains, the business applications and business data, etc. The credible cross-chain governance layer opens the smart contract to the governance nodes in the governance chain so that the governance nodes can invoke the smart contract, and the governance nodes perform control governance on the cross-chain interoperation between the first application subchain and the second application subchain by invoking and operating the smart contract corresponding to the governance service. For example, the credible cross-chain governance layer opens the smart contract to the first governance node and the second governance node for invoking, and the first governance node may invoke and operate the smart contract corresponding to unified identity management to manage organization information of the management organization of the first application subchain; and the second governance node may invoke and operate the smart contract corresponding to pipeline configuration management to configure an access channel, having access to the governance chain, of the second governance node.

(4) Security Support Layer

The security support layer of the cross-chain collaborative governance system is configured to provide cross-chain security rules, and guarantees the security of the cross-chain collaborative governance system based on the cross-chain security rules. The security support layer may be configured to provide the security rules for the credible cross-chain collaborative layer so as to enable the credible cross-chain collaborative layer to provide the collaborative service under the guidance of the cross-chain security rules provided by the security support layer in a process of performing the cross-chain interoperation between the first application subchain and the second application subchain; and the security support layer may be further configured to provide the security rules for the credible cross-chain governance layer so as to enable the credible cross-chain governance layer to perform control governance under the guidance of the cross-chain security rules provided by the security support layer in the process of performing the cross-chain interoperation between the first application subchain and the second application subchain.

The cross-chain security rules include but not limited to: a certificate compliance rule, a security sandbox rule, an algorithm security rule, a credible protection rule, a contract audit rule, a communication security rule and a key management security rule. For example, when performing TLS bidirectional authentication on the first application subchain and the second application subchain participating in cross-chain interoperation, the credible cross-chain collaborative layer may authenticate the security certificate of the first collaborative service program and the security certificate of the second collaborative service program based on the certificate compliance rule. The cross-chain security rules provide a security support for the cross-chain collaborative governance system from several aspects (such as communication security, security sandbox middleware, certificate compliance, contract audit, key management, a credible protection environment of nodes and a cross-chain relay service and cross-chain permission management, etc.), and can improve the security of the cross-chain interoperation between the application subchains in the cross-chain alliance.

In the embodiments of the present disclosure, the cross-chain collaborative governance system achieves the "chain-govern-chain" cross-chain interoperation mode based on cooperation of the cross-chain access application layer, the credible cross-chain collaborative layer, the credible cross-chain governance layer and the security support layer. The credible cross-chain collaborative layer supports the mutual communication between the first collaborative service program and the second collaborative service program, and direct communication between the first collaborative service program and the second collaborative service program can effectively improve the execution efficiency of the cross-chain interoperation between the first application subchain and the second application subchain. The first collaborative service program connects the first governance node with the first application subchain, the second collaborative service program connects the second governance node with the second application subchain, and the credible cross-chain collaborative layer supports the mutual communication between the first collaborative service program and the first governance node and the mutual communication between the second collaborative service program and the second governance node; and the credible cross-chain governance layer performs control governance on the cross-chain interoperation between the first application subchain and the second application subchain based on the mutual communication between the first collaborative service program and the first governance node and the mutual communication between the second collaborative service program and the second governance node, which also can effectively improve the execution efficiency of the cross-chain interoperation between the first application subchain and the second application subchain. Hence, the cross-chain collaborative governance system may provide collaborative service for the cross-chain interoperation between the application subchains in the cross-chain alliance, and perform control governance on the cross-chain interoperation between the application subchains in the cross-chain alliance, and the "chain-govern-chain" cross-chain interoperation mode can effectively improve the execution efficiency of the cross-chain interoperation between the application subchains in the cross-chain alliance.

Figure 4:
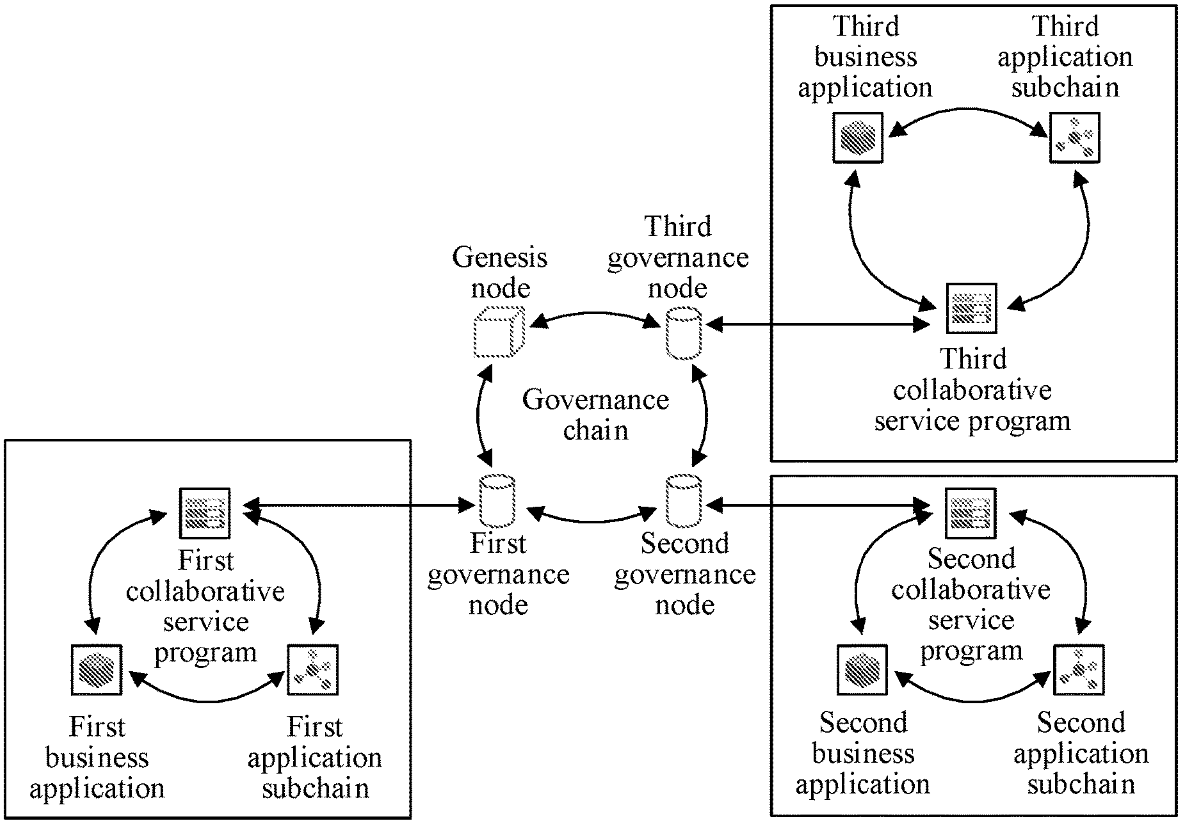
FIG. 4 is a schematic architectural diagram of a product model of the cross-chain collaborative governance system according to an embodiment of the present disclosure.

The cross-chain collaborative governance system shown in FIG. 3 can achieve a product model shown in FIG. 4, and FIG. 4 is a schematic architectural diagram of a product model of a cross-chain collaborative governance system provided by an embodiment of the present disclosure. As shown in FIG. 4, the governance chain includes a Genesis node, a first governance node, a second governance node and a third governance node. It is to be explained that the governance chain including the Genesis node, the first governance node, the second governance node and the third governance node is only an example, and in the practical application scenario, the number of the Genesis nodes and the governance nodes in the governance chain may be different.

The first governance node is associated with the first application subchain, the second governance node is associated with the second application subchain, and the third governance node is associated with the third application subchain. The first collaborative service program, the second collaborative service program and the third collaborative service program may communicate with one another. The first collaborative service program may communicate with the first governance node and connects the first governance node with the first application subchain and the first business application in the first blockchain network to which the first application subchain belongs, the second collaborative service program connects the second governance node with the second application subchain and the second business application in the second blockchain network to which the second application subchain belongs, and the third collaborative service program connects the third governance node with the third application subchain and the third business application in the third blockchain network to which the third application subchain belongs.

In the product model of the cross-chain collaborative governance system shown in FIG. 4, the processes that the application subchains join in cross-chain alliance, request cross-chain interoperation permission and perform cross-chain interoperation can be achieved. Taking the first application subchain and the second application subchain as an example, the three processes that the application subchains join in the cross-chain alliance, request a cross-chain interoperation permission and perform cross-chain interoperation are introduced below:

(1) Application Subchains Joining Cross-Chain Alliance

When the first application subchain applies to join in the cross-chain alliance, the management organization of the first application subchain needs to submit an application for joining the governance chain; after the governance chain agrees with the first application subchain to join in the cross-chain alliance, the management organization of the first application subchain may join in the governance chain to become the first governance node in the governance chain; the credible cross-chain collaborative layer of the cross-chain collaborative governance system deploys the first collaborative service program in the first service device in the first blockchain network to which the first application subchain belongs; and accordingly, the first application subchain successfully joins the cross-chain alliance and has a first condition for cross-chain interoperation. In a similar way, the achieving process of the second application subchain applying to join in the cross-chain alliance is similar to the above process.

(2) Application Subchains Requesting Cross-Chain Interoperation Permission

When the first application subchain in the cross-chain alliance has a business need for cross-chain interoperation with the second application subchain in the cross-chain alliance, the first application subchain needs to apply to the second application subchain for the cross-chain interoperation permission. Specifically, the first application subchain may initiate a cross-chain interoperation permission application on the governance chain, and the first governance node records the cross-chain interoperation permission application in the governance chain; after the second governance node acquires the cross-chain interoperation permission application of the first application subchain from the governance chain, the management organization of the second application subchain may respond to the cross-chain interoperation permission application of the first application subchain and generate a permission application result, and the second governance node records the permission application result in the governance chain; the first governance node may acquire the permission application result fed back by the second governance node from the governance chain; and if the permission application result indicates successful application, the first application subchain has the permission for cross-chain interoperation with the second application subchain, the first application subchain has a second condition for cross-chain interoperation, and the process of the first application subchain requesting the cross-chain interoperation permission is fully recorded on the governance chain, thereby achieving trace-remaining traceability of the process of requesting the cross-chain interoperation permission.

(3) Cross-Chain Interoperation Between Application Subchains

When the first application subchain and the second application subchain meet the first condition and the second condition of the cross-chain interoperation, namely, when the first application subchain and the second application subchain successfully join in the cross-chain alliance and have the cross-chain interoperation permission, the first application subchain and the second application subchain may perform cross-chain interoperation. Specifically, when the first collaborative service program monitors a service request of cross-chain interoperation on the first application subchain, the first collaborative service program may send the service request to the second collaborative service program; and the second collaborative service program may invoke the cross-chain interoperation engine, executes the cross-chain interoperation for the second application subchain, and returns an execution result of the cross-chain interoperation to the first collaborative service program. The first governance node may record the service request on the governance chain, and the second governance node may record the execution result on the governance chain. The whole process of the cross-chain interoperation between the first application subchain and the second application subchain may be recorded on the governance chain through block synchronization on the governance chain, thereby achieving trace-remaining traceability of the whole process of cross-chain interoperation.

With the development of the blockchain technology in industrial Internet, many valuable consortium blockchains (namely application subchains) based on the blockchain technology are constructed in specific business scenario fields, these application subchains play an important role in the specific business fields, such as judicial evidence storage, traceability, intellectual property protection, government affair big data share and institution supervision. The cross-chain collaborative governance system provided by the embodiments of the present disclosure may provide an efficient, secure and credible network channel for the application subchains so that the application subchains may perform secure and efficient cross-chain interoperation, thereby enabling data values between the application subchains to circulate. Cross-chain interoperation can be used between a supervision institution (e.g., a certification service entity, a judicial database, a drug administration, a financial regulator, etc.) and a regulated institution (e.g., a company/factory that has a product and/or a process to be certified, an entity that submits judicial evidence, a pharmaceutical company, a financial institution, etc.). For example, the first application subchain is managed by the regulated institution, the second application subchain is managed by the supervision institution, and the supervision institution needs to audit business data on the first application subchain of the regulated institution; the first application subchain may apply to join in the cross-chain alliance so that the regulated institution may join in the governance chain to become the first governance node in the governance chain for cross-chain governance; the second application subchain may also apply to join in the cross-chain alliance so that the supervision institution can join in the governance chain to become the second governance node in the governance chain for cross-chain governance; when the regulated institution needs to submit the business data to the supervision institution for audit, the first application subchain in the cross-chain alliance has a need for cross-chain interoperation with the second application subchain in the cross-chain alliance, and the first application subchain needs to apply to the second application subchain for the cross-chain interoperation permission; when the first application subchain and the second application subchain have the cross-chain interoperation permission, if monitoring the service request for cross-chain interoperation on the first application subchain, the first collaborative service program may send the service request to the second collaborative service program, and the service request may carry the business data on the first application subchain of the regulated institution; and an administrator of the supervision institution may log in the second collaborative service program through the second service device and invoke the cross-chain interoperation engine through the second collaborative service program to execute the cross-chain interoperation on the second application subchain, such as business data audit, and to return an execution result of the cross-chain interoperation to the first collaborative service program, such as an audit result of the business data. The first governance node may record the business data on the first application subchain of the regulated institution on the governance chain, and the second governance node may record the audit result for the business data on the governance chain.

In the embodiments of the present disclosure, the control governance on the cross-chain interoperation between the application subchains in the cross-chain alliance by the cross-chain collaborative governance system may include three stages including application subchains applying to join in cross-chain alliance, application subchains requesting cross-chain interoperation permission and cross-chain interoperation between application subchains, and the cross-chain collaborative governance system is adopted for performing the control governance on the three stages including application subchains joining cross-chain alliance, application subchains requesting cross-chain interoperation permission and cross-chain interoperation between application subchains, thereby providing an efficient, secure and easy-to-expand cross-chain interoperation mode.

Based on the schematic architectural diagram of the cross-chain collaborative governance system shown in FIG. 3 and the schematic architectural diagram of the product model of the cross-chain collaborative governance system shown in FIG. 4, the cross-chain collaborative governance system provided by the embodiments of the present disclosure has following five characteristics:

(1) Universality and Easy Expandability

A cross-chain business scenario of industry blockchains has many participants (namely the management organizations of the application subchains), many networking topology models and various implementation limiting conditions, and meanwhile needs to support a cross-chain interoperation demand between the application subchains which are each other's isomorphic chains and the application subchains which are each other's heterogeneous chains. To meet the cross-chain business scenario demand of the industry blockchains, the cross-chain collaborative governance system provided by the embodiments of the present disclosure has strong universality and easy expandability. A distributed relay service in the cross-chain collaborative governance system may adapt to the access of the application subchains which are each other's isomorphic chains and the application subchains which are each other's heterogeneous chains, provides a universal and standard access channel (namely, the application subchains which are each other's isomorphic chains and the application subchains which are each other's heterogeneous chains can access to the cross-chain collaborative governance system through the standard access channel), may be transversely and dynamically connected with the participants (namely, transverse access of the multiple application subchains), performs longitudinal dynamic interflow governance (namely, longitudinal interflow governance of a cross-chain access application layer, a credible cross-chain collaborative layer, a credible cross-chain governance layer and a security support layer), and may smoothly support the multiple networking topology models (namely, the networking topology models between blockchain networks to which the multiple application subchains belongs are different), and thus has extremely high universality and easy expandability. Meanwhile, a multi-stage and distributed pipeline communication protocol with permission is achieved, and the pipeline communication protocol means that any communication protocol is supported between the first collaborative service program and the second collaborative service program, or between the first collaborative service program and the first governance node, or between the second collaborative service program and the second governance node, and thus cross-chain collaborative interaction has extremely high usability.

(2) Multi-Side Co-Governance

The cross-chain business scenario of the industry blockchains has cross-chain interoperation demands for a strong trust basis between participants, cross-chain interoperation process transparency, controllable cross-chain interoperation permissions, cross-chain interoperation process traceability, etc. To meet the demands of the cross-chain business scenario of the industry blockchains, the cross-chain collaborative governance system provided by the embodiments of the present disclosure is a multi-side co-constructed and co-governed collaborative governance platform established in a means of the blockchains, the management organizations of the application subchains in the cross-chain alliance join in the governance chain to become a plurality of governance nodes in the governance chain so as to jointly participate in control governance on the cross-chain interoperation.

(3) High Efficiency

The cross-chain interoperation aims to construct a communication network between the blockchains, eliminate isolated data islands, transmit data between blockchain networks, and construct a blockchain valuable Internet. A large data volume of cross-chain interflow is one of characteristics of the cross-chain business scenario of the industry blockchains, and owning high-efficiency cross-chain interoperation capability has become a basic requirement of a cross-chain interoperation system. To meet the demands of the cross-chain business scenario of the industry blockchains, the cross-chain collaborative governance system provided by the embodiments of the present disclosure architecturally achieves large-scale networking and distributed relay service in a governance mode, makes transaction verification more efficient and achieves a simplified permission verifying process and efficient communication in the whole cross-chain interoperation process based on the permission control capability of the governance system under the "chain-govern-chain" design concept.

(4) High Security

The cross-chain collaborative governance system needs to guarantee high security in the aspects such as participant identities, business data, cross-chain communication processes and contract security and compliance. To meet the demands, the cross-chain collaborative governance system provided by the embodiments of the present disclosure designs a security guaranteed architecture from the aspects such as communication security, security sandbox middleware, certificate compliance, contract audit, key management, node and cross-chain relay service credible protection environment and cross-chain permission management so as to guarantee the high security of the whole cross-chain interoperation process.

(5) Trace-Remaining Traceability

The cross-chain collaborative governance system of the industry blockchains is constructed based on trust, and cross-chain interoperation trace remaining, audit and tracing are also common rigid demands besides cross-chain interoperation confirmation achieved through transaction verification and other technological means. To meet the demands, the cross-chain collaborative governance system provided by the embodiments of the present disclosure records cross-chain transaction ledgers on the governance chain through the smart contract (namely, the governance nodes in the governance chain upload the service request for the cross-chain interoperation, the execution result of the cross-chain interoperation, the cross-chain interoperation permission application, the permission application result, and the like to the governance chain) and confirms a transaction final state (namely, the execution result of the cross-chain interoperation is verified), and meanwhile provides functions such as cross-chain interoperation trace remaining, tracing, abnormality early warning and a final consistency account checking mechanism.

In conclusion, the cross-chain collaborative governance system provided by the embodiments of the present disclosure governs and controls the whole process of the cross-chain interoperation between the application subchains in the cross-chain alliance through the multi-side co-governance governance chain. The embodiments of the present disclosure construct a universal, easy-to-expand, multi-side co-governance, high-efficiency, high-security and trace-remaining-traceability cross-chain collaborative governance system. Based on the cross-chain collaborative governance system, cross-chain interoperability between different application subchains (such as application subchains which are each other's heterogeneous chains and application subchains belonging to different application scenarios) can be greatly improved, and credible data circulation and value exchange are effectively performed. The embodiments of the present disclosure provide the cross-chain collaborative governance system for the industry blockchains, which is a bridge for an isomorphic and heterogenous cross-chain interoperation platform and a distributed application business system, provides the capability from industry blockchain technology platform collaboration to blockchain application business system collaboration, and provides a distributed, high-security and multi-stage cross-chain interoperation model on the basis of the governance chain. The cross-chain collaborative governance system, as an efficient, easy-to-use, high-flexibility and high-security cross-chain open platform lubricates construction of a value sharing system based on industry blockchains, thereby achieving synergistic interaction between the application subchains.

Figure 5:
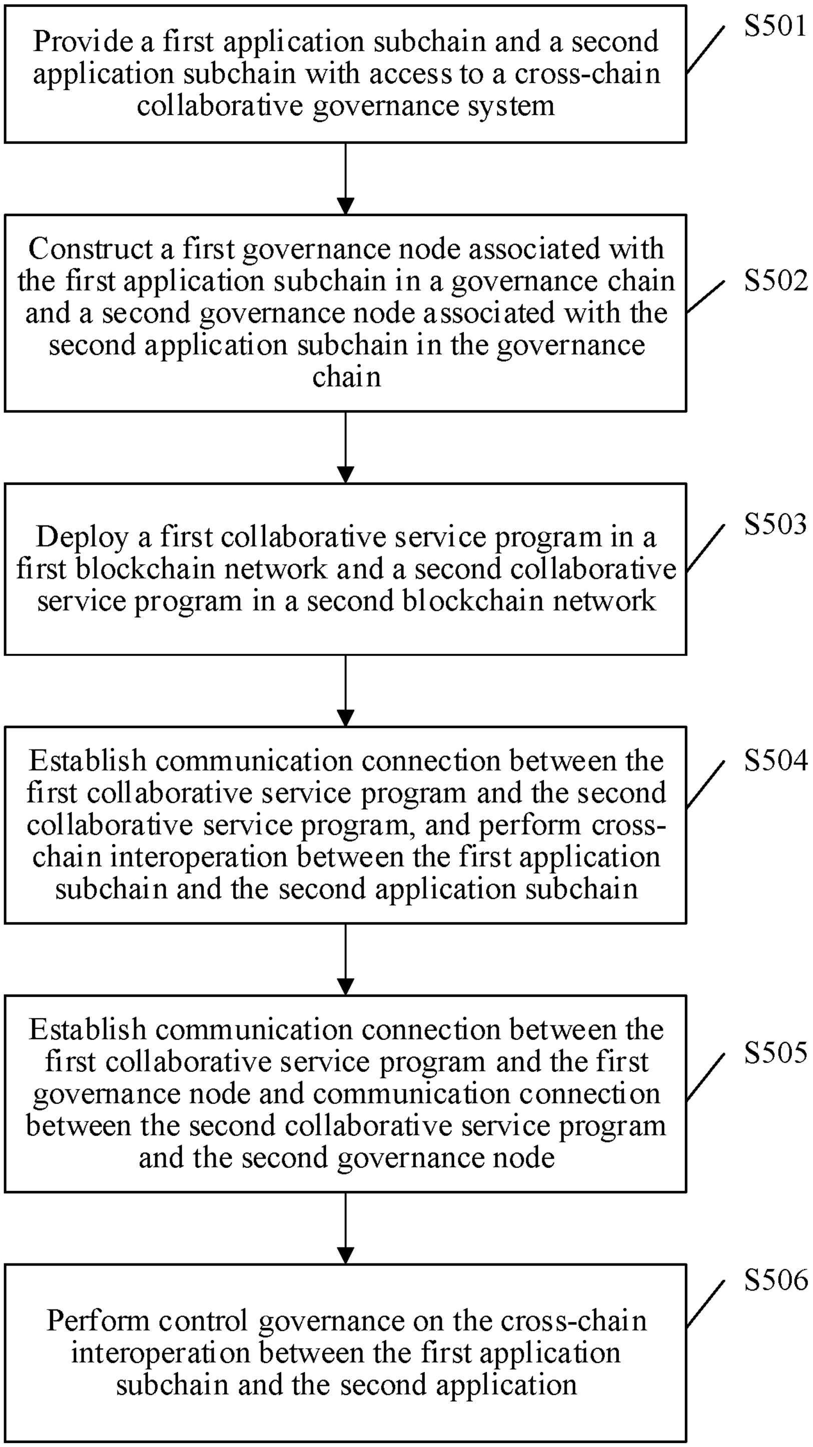
FIG. 5 is a schematic flowchart of a cross-chain collaborative governance method according to an embodiment of the present disclosure.

The embodiments of the present disclosure further provide a cross-chain collaborative governance method capable of being applied to the cross-chain collaborative governance system shown in FIG. 3. FIG. 5 is a schematic flowchart of a cross-chain collaborative governance method according to an embodiment of the present disclosure. The cross-chain collaborative governance method may include the following steps S501-S506:

S501: Make a first application subchain and a second application subchain access a cross-chain collaborative governance system.

Figure 6:
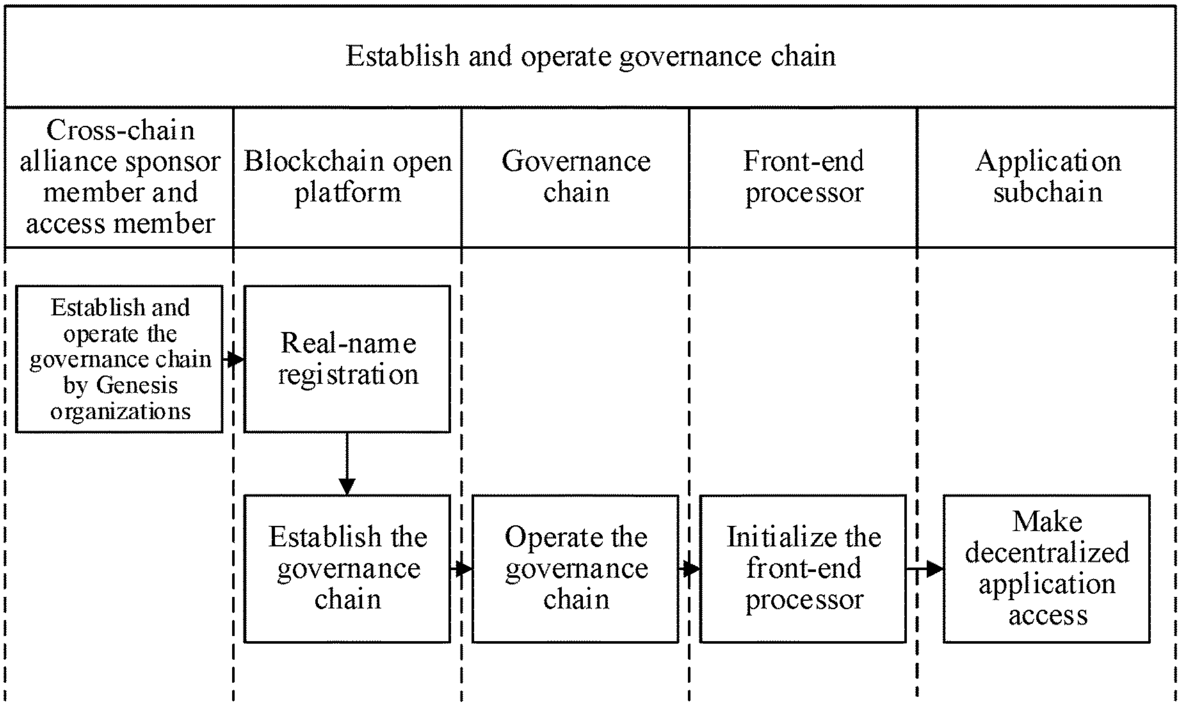
FIG. 6 is a schematic flowchart of a governance chain establishing process according to an embodiment of the present disclosure.

Before step S501, a plurality of (two or more, such as 4) Genesis organizations may establish, operate and initialize a governance chain by a Blockchain as a Service (BAAS) platform so as to construct the cross-chain collaborative governance system. FIG. 6 is a schematic flowchart of a governance chain establishing process according to an embodiment of the present disclosure. As shown in FIG. 6, during governance chain establishing, each Genesis organization needs to perform real-name registration on the BAAS platform, fills up organization information of the Genesis organization, and constructs corresponding Genesis nodes, and then the multiple Genesis nodes perform networking operation of the governance chain; after the governance chain successfully runs, the Genesis nodes need to initialize a front-end processor, and Dapp is made access a blockchain network to which the Genesis organizations. The front-end processor may be understood as an adapter of the Genesis nodes belongs and is configured to perform data format conversion, language conversion, and the like between different communication protocols; after the governance chain successfully runs, the Genesis nodes also need to issue collaborative service programs to the Genesis organizations and deploy the collaborative service programs in the blockchain network to which the Genesis organizations belongs; and at the time, the governance chain is established and successfully runs.

Figure 7:
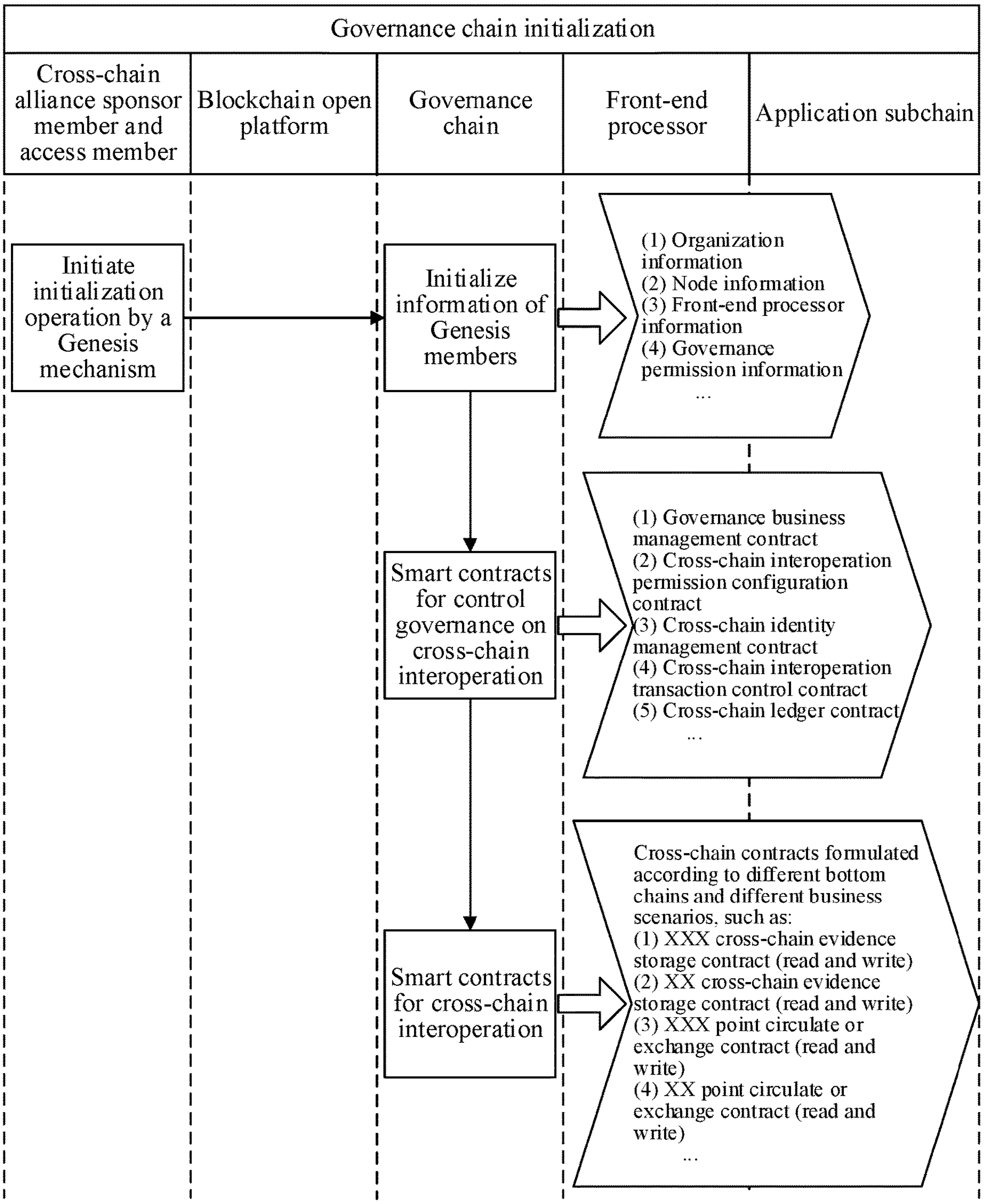
FIG. 7 is a schematic flowchart of a governance chain initialization process according to an embodiment of the present disclosure.

After the governance chain is established and successfully runs, the governance chain needs to be initialized. FIG. 7 is a schematic flowchart of a governance chain initialization process according to an embodiment of the present disclosure. As shown in FIG. 7, the Genesis nodes upload information of each Genesis member (such as organization information of the Genesis organizations, node information of the Genesis nodes, front-end processor information and governance permission information) to the governance chain and deploy smart contracts related to governance service to the governance chain, thereby finishing the governance chain initialization process. The smart contracts related to the governance service may include a smart contract for control governance on cross-chain interoperation (such as a cross-chain interoperation permission configuration contract, a cross-chain interoperation identity management contract, a cross-chain interoperation transaction control contract and a cross-chain ledger contract shown in FIG. 7) and smart contracts formulated according to different bottom chains and different business scenarios for executing cross-chain interoperation (such as a cross-chain evidence storage contract and a point circulate or exchange contract shown in FIG. 7), which are not limited by the embodiments of the present disclosure.

Figure 8:
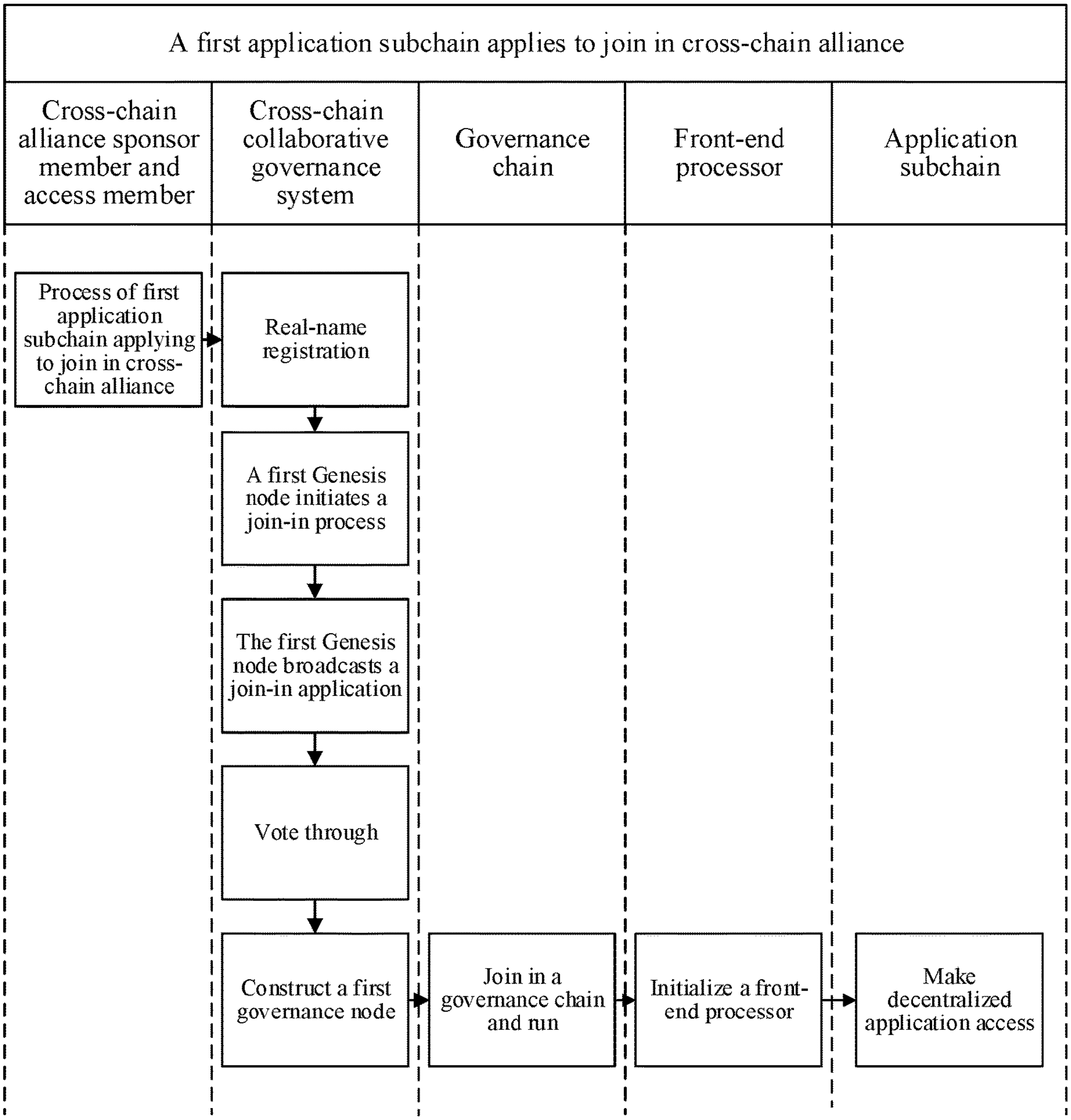
FIG. 8 is a schematic flowchart of an application subchain applying to join in a cross-chain alliance according to an embodiment of the present disclosure.

After the governance chain is established and initialized, the application subchains may apply to join in a cross-chain alliance; and the governance chain of the cross-chain collaborative governance system includes M governance nodes, the M governance nodes include P Genesis nodes with a governance chain management permission, and P is a positive integer and is less than or equal to M. FIG. 8 is a schematic flowchart of an application subchain applying to join in a cross-chain alliance according to an embodiment of the present disclosure. As shown in FIG. 8, when a first application subchain applies to join in the cross-chain alliance, an administrator of a management organization of the first application subchain may perform real-time registration through a cross-chain collaborative governance interface, displayed by a first service device, of a cross-chain collaborative governance system, and after the cross-chain collaborative governance system successfully authenticates real-time registration information, the administrator of the management organization of the first application subchain may fill up identity information of a first blockchain network in the cross-chain collaborative governance interface (such as organization information of the management organization of the first application subchain) and parameters of the first application subchain (such as subchain information of the first application subchain), and the cross-chain collaborative governance system generates a joining application according to the identity information of the first blockchain network and the parameters of the first application subchain; a first Genesis node broadcasts the joining application of the first application subchain in the governance chain, the joining application includes the identity information of the first blockchain network and the parameters of the first application subchain, and the first Genesis node is any one of the P Genesis nodes; the governance nodes in the governance chain votes on the joining application; if vote through, the first application subchain joins the cross-chain alliance; vote-through may mean that the number of the governance nodes agreeing with the first application subchain to join in the cross-chain alliance exceeds a number threshold, the number threshold may be ½, ⅔ or ⅘ of the number of all the governance nodes in the governance chain, or the number threshold may be equal to the number of all the governance nodes in the governance chain. That is, the first application subchain can join in the cross-chain alliance only when all the governance nodes in the governance chain agree with the first application subchain to join in the cross-chain alliance; and accordingly, the first application subchain successfully joins the cross-chain alliance and may access to the cross-chain collaborative governance system, a first governance node associated with the first application subchain is established in the governance chain, the governance chain runs again, the front-end processor is initialized, Dapp is made access the first blockchain network to which the first application subchain belongs, the first governance node participates in control governance on the cross-chain interoperation, and further a first collaborative service program may be deployed in the first blockchain network to which the first application subchain belongs, such that the first collaborative service program can normally connect the first governance node with the first application subchain.

Similarly, the second application subchain may also apply to join in the cross-chain alliance, after successfully joining the cross-chain alliance, the second application subchain may be made access the cross-chain collaborative governance system, a second governance node associated with the second application subchain is established in the governance chain, the second governance node participates in control governance on the cross-chain interoperation, and further a second collaborative service program is deployed in a second blockchain network to which the second application subchain belongs, such that the second collaborative service program can normally connect the second governance node with the second application subchain.

S502: Construct a first governance node associated with the first application subchain in the governance chain and a second governance node associated with the second application subchain in the governance chain.

S503: Deploy a first collaborative service program in a first blockchain network and a second collaborative service program in a second blockchain network.

The governance chain includes M governance nodes, and M is an integer greater than 1; the M governance nodes include P Genesis nodes with a governance chain management permission, and P is a positive integer and is less than or equal to M; the first application subchain belongs to the first blockchain network, and the first blockchain network includes a first service device; and the second application subchain belongs to the second blockchain network, and the second blockchain network includes a second service device.

The deploying a first collaborative service program in a first blockchain network may include the following steps: issuing, by a second Genesis node, an indication message to the first service device, wherein the indication message includes a collaborative service program or an address of the collaborative service program; and enabling the first service device to acquire the collaborative service program according to the indication message, and configuring parameters of the first application subchain in the collaborative service program so as to form the first collaborative service program. The second Genesis node is any one of the P Genesis nodes. The deploying a second collaborative service program in a second blockchain network may include the following steps: issuing, by a third Genesis node, an indication message to the second service device, wherein the indication message includes a collaborative service program or an address of the collaborative service program; and enabling the second service device to acquire the collaborative service program according to the indication message, and configuring parameters of the second application subchain in the collaborative service program so as to form the second collaborative service program. The third Genesis node is any one of the P Genesis nodes. It is to be explained that the first Genesis node, the second Genesis node and the third Genesis node may be the same, and may also be different, which are not limited in the embodiments of the present disclosure.

S504: Establish communication connection between the first collaborative service program and the second collaborative service program, and perform cross-chain interoperation between the first application subchain and the second application subchain.

Figure 9:
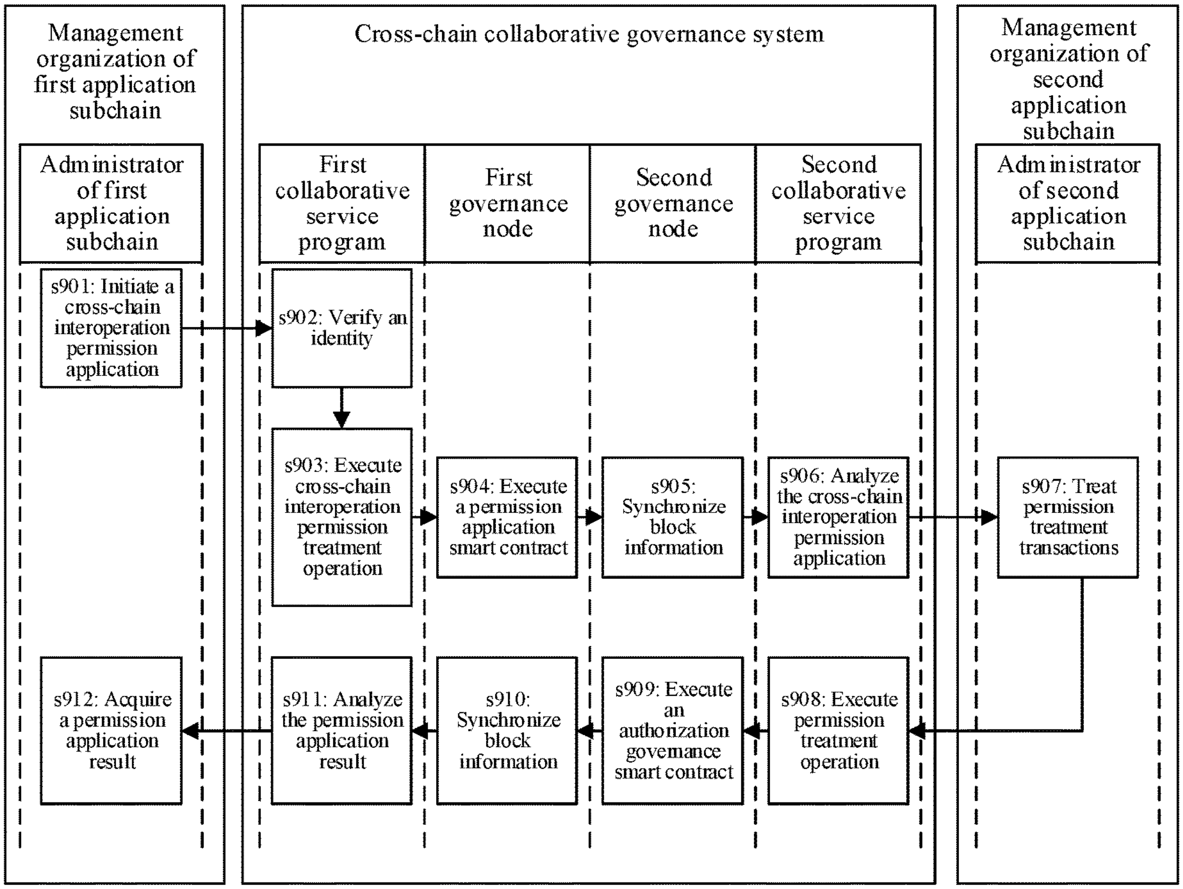
FIG. 9 is a schematic flowchart of a cross-chain interoperation applying process according to an embodiment of the present disclosure.

Before step S504, namely, before achieving the cross-chain interoperation between the first application subchain and the second application subchain based on the mutual communication between the first collaborative service program and the second collaborative service program, the first application subchain needs to apply to the second application subchain for a cross-chain interoperation permission, or the second application subchain needs to apply to the first application subchain for the cross-chain interoperation permission. Taking the first application subchain applying to the second application subchain for the cross-chain interoperation permission as an example, FIG. 9 is a schematic flowchart of a cross-chain interoperation applying process according to an embodiment of the present disclosure, and as shown in FIG. 9, the cross-chain interoperation applying process may include the following substeps s901-*s*912:

s901: Initiate a cross-chain interoperation permission application by an administrator of a first application subchain.

The administrator of the first application subchain may input first account information through a cross-chain collaborative governance interface of a cross-chain collaborative governance system, logs in a first collaborative service program, initiates, by the first collaborative service program, the cross-chain interoperation permission application to the second application subchain, the cross-chain collaborative governance interface of the cross-chain collaborative governance system is displayed on a first service device, wherein, the cross-chain interoperation permission application includes the first account information and parameters of the second application subchain.

s902: Verify, by the first collaborative service program, an identity of the administrator of the first application subchain.

The first collaborative service program may verify the first account information so as to verify the identity of the administrator of the first application subchain. Specifically, the first account information acquired by the first collaborative service program may be obtained through encryption via a private key of the first application subchain, and the first collaborative service program may acquire a public key of the first application subchain from the governance chain; if the first collaborative service program successfully verify the first account information by adopting the public key of the first application subchain, it is determined that authentication on the administrator of the first application subchain through the first collaborative service program passes; and if the first collaborative service program fails to verify the first account information by adopting the public key of the first application subchain, it is determined that authentication on the administrator of the first application subchain through the first collaborative service program does not pass.

s903: Execute, by the first collaborative service program, cross-chain interoperation permission treatment operation and send a permission application smart contract invoke request to a first governance node if authentication on the administrator of the first application subchain through the first collaborative service program passes. The permission application smart contract invoke request may carry a cross-chain interoperation permission application.

s904: In response to the permission application smart contract invoke request, invoke and execute, by the first governance node, a permission application smart contract and upload the cross-chain interoperation permission application to the governance chain.

The first governance node may generate a first block according to the cross-chain interoperation permission application and upload the first block to the governance chain.

s905: Synchronize, by a second governance node, block information from the governance chain, acquire the cross-chain interoperation permission application from the first block, and send the cross-chain interoperation permission application to a second collaborative service program.

s906: Analyze, by the second collaborative service program, the cross-chain interoperation permission application and generate permission treatment transactions.

s907: Treat, by an administrator of the second application subchain, the permission treatment transactions to obtain a treatment result of the permission treatment transactions.

The administrator of the second application subchain may input second account information through the cross-chain collaborative governance interface of the cross-chain collaborative governance system, logs in the second collaborative service program, treats the permission treatment transactions through the second collaborative service program to generate the treatment result of the permission treatment transactions, and the treatment result includes authorization agreement or authorization refusal. The cross-chain collaborative governance interface of the cross-chain collaborative governance system is displayed on the second service device.

s908: Execute, by the second collaborative service program, treatment operation of the permission treatment transactions, generate a permission application result according to the treatment result of the permission treatment transactions, and send an authorization governance smart contract invoke request to the second governance node. The authorization governance smart contract invoke request may carry the permission application result, and the permission application result may include authorization agreement or authorization refusal.

s909: In response to the authorization governance smart contract invoke request, invoke and execute, by the second governance node, an authorization governance smart contract and upload a permission application result to the governance chain.

The second governance node may generate a second block according to the permission application result and upload the second block to the governance chain.

s910: Synchronize, by the first governance node, block information from the governance chain, acquire the permission application result from the second block, and send the permission application result to the first collaborative service program.

s911: Analyze, by the first collaborative service program, the permission application result.

s912: Acquire, by the administrator of the first application subchain, the permission application result from the first collaborative service program.

The administrator of the first application subchain may input the first account information through the cross-chain collaborative governance interface of the cross-chain collaborative governance system, and logs in the first collaborative service program so as to acquire the permission application result from the first collaborative service program, and the cross-chain collaborative governance interface of the cross-chain collaborative governance system is displayed in the first service device.

It can be known from the cross-chain interoperation permission applying process shown in FIG. 9 that the cross-chain interoperation permission applying process between the first application subchain and the second application subchain can be achieved through the mutual communication between the first collaborative service program and the first governance node and the mutual communication between the second collaborative service program and the second governance node; and a verifying process in the cross-chain interoperation permission applying process is simplified, and the execution efficiency of the cross-chain interoperation permission applying process is improved based on the permission control capability of the cross-chain collaborative governance system. The whole process that the first application subchain applies to the second application subchain for the cross-chain interoperation permission is recorded on the governance chain, thereby achieving trace-remaining traceability for the cross-chain interoperation permission applying process.

S505: Establish mutual communication between the first collaborative service program and the first governance node and mutual communication between the second collaborative service program and the second governance node.

S506: Perform control governance on cross-chain interoperation between the first application subchain and the second application subchain.

From step S504 to step S506, when the first collaborative service program monitors a service request of cross-chain interoperation on the first application subchain, the first collaborative service program may send the service request to the second collaborative service program; the service request includes the parameters of the second application subchain; and correspondingly, the second collaborative service program may verify the service request, if verification passes, the second collaborative service program invokes a cross-chain interoperation engine, executes the cross-chain interoperation for the second application subchain, and returns an execution result of the cross-chain interoperation to the first collaborative service program.

The first collaborative service program may send the service request to the first governance node based on communication connection between the first collaborative service program and the first governance node to enable the first governance node to invoke and execute a cross-chain governance smart contract and upload the service request to the governance chain; and the second collaborative service program may send an execution result to the second governance node based on communication connection between the second collaborative service program and the second governance node to enable the second governance node to invoke and execute the cross-chain governance smart contract and upload the execution result to the governance chain.

The first collaborative service program and the second collaborative service program may each include a cross-chain service interface, a subchain proxy service subprogram and a cross-chain interoperation engine. The cross-chain service interface in the first collaborative service program is configured to receive a service request of cross-chain interoperation in the first blockchain network to which the first application subchain belongs; the subchain proxy service subprogram in the first collaborative service program is configured to monitor the service request of cross-chain interoperation on the first application subchain; and the cross-chain interoperation engine in the first collaborative service program is configured to execute the cross-chain interoperation. The cross-chain service interface in the second collaborative service program is configured to receive a service request of cross-chain interoperation in the second blockchain network to which the second application subchain belongs; the subchain proxy service subprogram in the second collaborative service program is configured to monitor the service request of cross-chain interoperation on the second application subchain; and the cross-chain interoperation engine in the second collaborative service program is configured to execute the cross-chain interoperation.

When the subchain proxy service subprogram in the first collaborative service program monitors the existence of the service request of cross-chain interoperation on the first application subchain, the cross-chain interoperation engine in the first collaborative service program may be triggered to execute the cross-chain interoperation, thereby achieving the cross-chain interoperation between the first application subchain and the second application subchain at the time. For details, refer to the description of an embodiment shown in FIG. 10. Or, when the cross-chain service interface in the first collaborative service program receives a cross-chain interoperation service request sent by a first business application in the first blockchain network to which the first application subchain belongs, the cross-chain interoperation engine in the first collaborative service program may be triggered to execute the cross-chain interoperation, thereby achieving the cross-chain interoperation between the first business application and the second application subchain at the time. For details, refer to description of an embodiment shown in FIG. 11.

Figure 10:
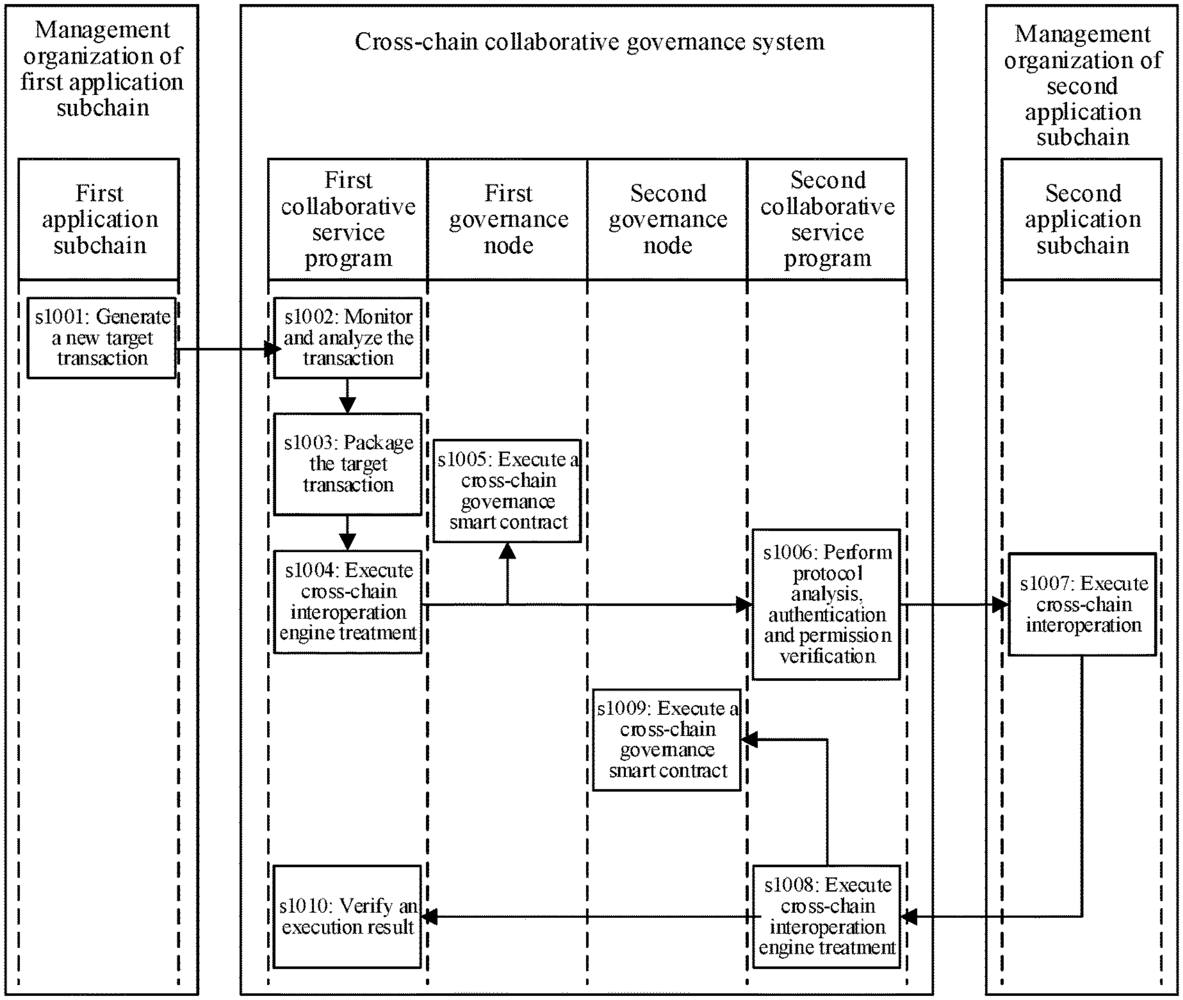
FIG. 10 is a schematic flowchart of a cross-chain interoperation process according to an embodiment of the present disclosure.

FIG. 10 is a schematic flowchart of a cross-chain interoperation process according to an embodiment of the present disclosure, and as shown in FIG. 10, the cross-chain interoperation process between the first application subchain and the second application subchain may include the following substeps s1001-*s*1010:

s1001: Generate a new target transaction on the first application subchain.

The target transaction may carry a cross-chain label, i.e., the target transaction needs to execute the cross-chain interoperation; and the cross-chain label may include a to address of the target transaction (namely an address of the second application subchain) or a smart contract address, and the smart contract address refers to an address where a smart contract needs to be invoked during the cross-chain interoperation.

s1002: Analyze the target transaction by a first collaborative service program when the subchain proxy service subprogram in the first collaborative service program monitors that the target transaction generated on the first application subchain needs to execute the cross-chain interoperation.

The first collaborative service program analyzes the target transaction to generate a service request, the service request may carry parameters of the second application subchain and transaction data of the target transaction, and the parameters of the second application subchain may include the address of the second application subchain or subchain information of the second application subchain.

s1003: Package, by the first collaborative service program, the target transaction.

The first collaborative service program packages the service request according to a cross-chain protocol to obtain a service request data packet.

s1004: Invoke, by the first collaborative service program, the cross-chain interoperation engine of the first collaborative service program to treat the target transaction.

The invoking, by the first collaborative service program, the cross-chain interoperation engine of the first collaborative service program to treat the target transaction may specifically include the following steps: sending, by the first collaborative service program, a cross-chain governance smart contract invoke request to the first governance node, wherein the cross-chain governance smart contract invoke request may carry the service request data packet; and acquiring, by the first collaborative service program, the address of the second collaborative service program from the governance chain through route addressing according to the address of the second application subchain, and sending the service request data packet to the second collaborative service program. It is to be explained that after the second application subchain successfully has access to a cross-chain alliance, the governance chain stores the address of the second application subchain and the address of the second collaborative service program in an associated manner.

s1005: In response to the cross-chain governance smart contract invoke request, invoke and execute, by the first governance node, the cross-chain governance smart contract and upload the service request data packet to the governance chain.

s1006: Perform, by the second collaborative service program, protocol analysis, authentication and permission verification.

The second collaborative service program may analyze the service request data packet based on the cross-chain protocol to obtain the service request. The service request may be verified, and if verification passes, step s1007 is executed. The authentication on the service request may include: bidirectional authentication of the first collaborative service program and the second collaborative service program, and verification on the cross-chain interoperation permission of the first application subchain through the second collaborative service program. The service request may include a security certificate of the first collaborative service program (such as a CA certificate of the first collaborative service program).

The bidirectional authentication of the first collaborative service program and the second collaborative service program is TLS bidirectional authentication, and may specifically include the following steps: verifying, by the second collaborative service program, the security certificate of the first collaborative service program; sending, by the second collaborative service program, the security certificate (such as a CA certificate of the second collaborative service program) of the second collaborative service program to the first collaborative service program for verification; determining that service request verification passes if the second collaborative service program verifies that the security certificate of the first collaborative service program passes, and the first collaborative service program verifies that the security certificate of the second collaborative service program passes; and determining that service request verification does not pass if the second collaborative service program verifies that the security certificate of the first collaborative service program does not pass, and/or the first collaborative service program verifies that the security certificate of the second collaborative service program does not pass.

The verification, by the second collaborative service program, on the cross-chain interoperation permission of the first application subchain may specifically include the following steps: acquiring, by the second collaborative service program, an authorization list from the governance chain, wherein the authorization list includes parameters of application subchains with the cross-chain interoperation permission; indicating that the first application subchain has the cross-chain interoperation permission, and permission verification passes if the authorization list includes parameters of the first application subchain; and indicating that the first application subchain does not have the cross-chain interoperation permission, and permission verification does not pass if the authorization list does not include the parameters of the first application subchain. Based on permission control capability of a governance system, the governance chain stores the authorization list, the authorization list may be directly acquired from the governance chain to perform permission verification in a cross-chain interoperation permission verifying process so as to achieve a simplified permission verifying process and efficient communication in the whole cross-chain interoperation process.

s1007: Invoke, by the second collaborative service program, the cross-chain interoperation engine of the second collaborative service program, and perform cross-chain interoperation on the second application subchain.

After the authentication and permission verification pass, the second collaborative service program invokes the cross-chain interoperation engine of the second collaborative service program, executes the cross-chain interoperation for the second application subchain, and generates an execution result of the cross-chain interoperation.

s1008: Invoke, by the second collaborative service program, the cross-chain interoperation engine of the second collaborative service program to treat the execution result.

The invoking, by the second collaborative service program, the cross-chain interoperation engine of the second collaborative service program to treat the execution result may include the following steps: sending, by the second collaborative service program, the cross-chain governance smart contract invoke request to the second governance node, wherein the cross-chain governance smart contract invoke request may carry the execution result of the cross-chain interoperation; and sending, by the second collaborative service program, the cross-chain interoperation execution result to the first collaborative service program.

s1009: In response to the cross-chain governance smart contract invoke request, invoke and execute, by the second governance node, the cross-chain governance smart contract and upload the execution result to the governance chain.

s1010: Verify, by the first collaborative service program, the execution result.

The verifying, by the first collaborative service program, the execution result may include the following steps: acquiring, by the first collaborative service program, the execution result uploaded by the first governance node from the governance chain, and comparing the execution result uploaded by the first governance node with a received execution result; indicating that verification succeeds if the execution result uploaded by the first governance node is the same as the received execution result, and ending the cross-chain interoperation between the first application subchain and the second application subchain; and indicating that verification fails if the execution result uploaded by the first governance node is different from the received execution result.

It can be known from the cross-chain interoperation process between the first application subchain and the second application subchain shown in FIG. 10 that the cross-chain interoperation process between the first application subchain and the second application subchain can be achieved through the mutual communication between the first collaborative service program and the first governance node and the mutual communication between the second collaborative service program and the second governance node; and the verifying process in the cross-chain interoperation process is simplified, and the execution efficiency of the cross-chain interoperation between the first application subchain and the second application subchain is improved based on the permission control capability of the cross-chain collaborative governance system. The first governance node and the second governance node in the governance chain perform control governance on the cross-chain interoperation so that the whole process of the cross-chain interoperation between the first application subchain and the second application subchain can be recorded on the governance chain, thereby achieving trace-remaining traceability of the whole process of cross-chain interoperation.

Figure 11:
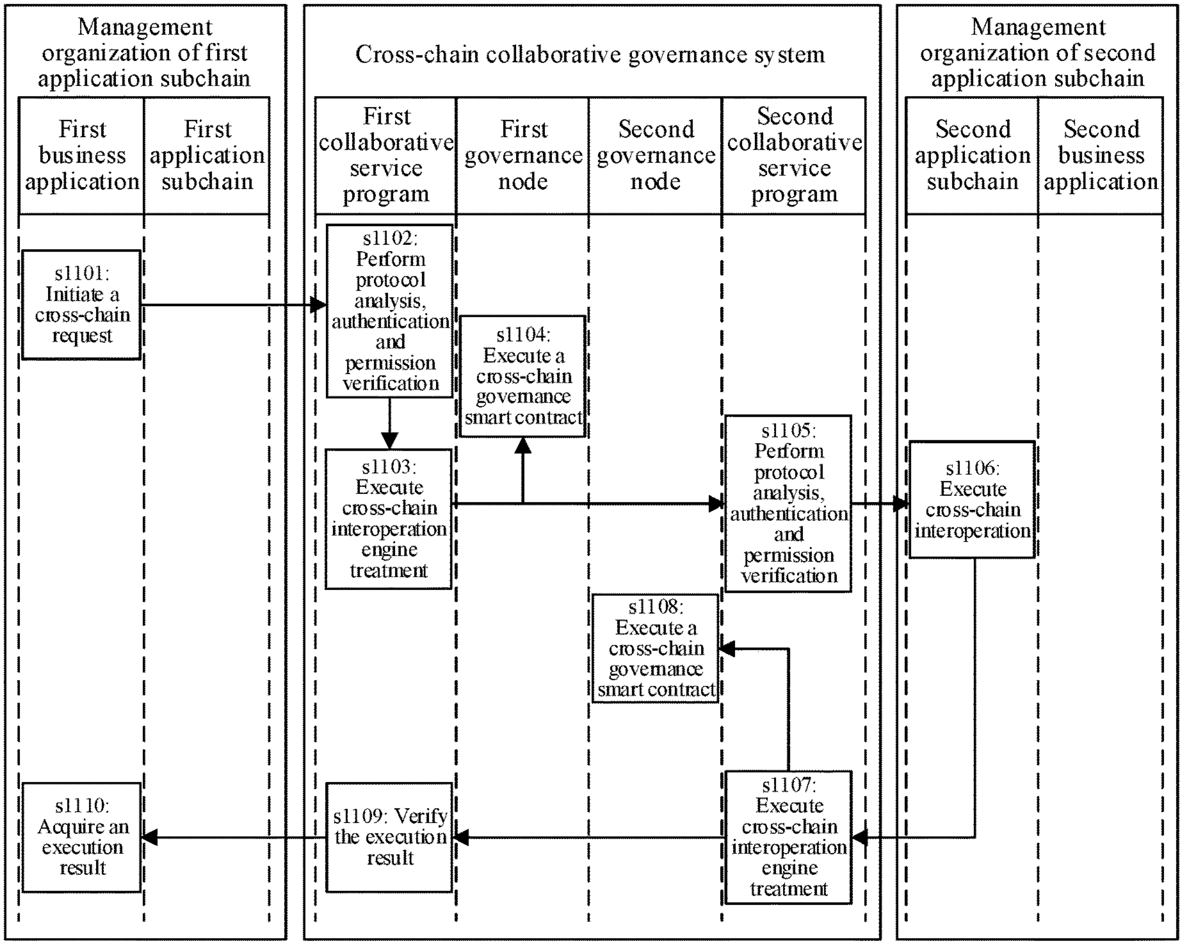
FIG. 11 is a schematic flowchart of a cross-chain interoperation process according to an embodiment of the present disclosure.

FIG. 11 is a schematic flowchart of another cross-chain interoperation process according to an embodiment of the present disclosure, and as shown in FIG. 11, the cross-chain interoperation process between the first business application and the second application subchain may include the following substeps s1101-*s*1110:

s1101: Send, by the first business application, a service request to the first collaborative service program based on a cross-chain protocol.

The service request may carry parameters of the second application subchain and transaction data of a target transaction, and the parameters of the second application subchain may include an address of the second application subchain or subchain information of the second application subchain.

s1102: Perform, by the first collaborative service program, protocol analysis, authentication and permission verification.

The first collaborative service program may analyze the service request based on the cross-chain protocol. The service request may be verified, and if verification passes, step s1103 is executed. The authentication on the service request may include: bidirectional authentication of the first collaborative service program and the second collaborative service program, and verification on the cross-chain interoperation permission of the second application subchain through the first collaborative service program, wherein the implementation of the two verification achieving modes is introduced in the embodiment shown in FIG. 10. For details, refer to related introduced contents. s1103: Invoke, by the first collaborative service program, the cross-chain interoperation engine of the first collaborative service program to treat the target transaction.

The invoking, by the first collaborative service program, the cross-chain interoperation engine of the first collaborative service program to treat the target transaction may specifically include the following steps: sending, by the first collaborative service program, the cross-chain governance smart contract invoke request to the first governance node, wherein the cross-chain governance smart contract invoke request may carry the service request. acquiring, by the first collaborative service program, the address of the second collaborative service program from the governance chain through route addressing according to the address of the second application subchain, and sending the service request to the second collaborative service program. It is to be explained that after the second application subchain successfully has access to a cross-chain alliance, the governance chain stores the address of the second application subchain and the address of the second collaborative service program in an associated manner.

s1104: In response to the cross-chain governance smart contract invoke request, invoke and execute, by the first governance node, the cross-chain governance smart contract and upload the service request to the governance chain.

s1105: Perform, by the second collaborative service program, protocol analysis, authentication and permission verification.

The second collaborative service program may analyze the service request based on the cross-chain protocol. The service request may be verified, and if verification passes, step s1106 is executed. The authentication on the service request may include: bidirectional authentication of the first collaborative service program and the second collaborative service program, and verification on the cross-chain interoperation permission of the first application subchain through the second collaborative service program, wherein the implementation of the two verification is introduced in the embodiment shown in FIG. 10. For details, refer to related introduced contents in detail.

s1106: Invoke, by the second collaborative service program, the cross-chain interoperation engine of the second collaborative service program, and perform cross-chain interoperation on the second application subchain.

After the authentication and permission verification pass, the second collaborative service program invokes the cross-chain interoperation engine of the second collaborative service program, executes the cross-chain interoperation for the second application subchain, and generates an execution result of the cross-chain interoperation.

s1107: Invoke, by the second collaborative service program, the cross-chain interoperation engine of the second collaborative service program to treat the execution result.

The invoking, by the second collaborative service program, the cross-chain interoperation engine of the second collaborative service program to treat the execution result may include the following steps: sending, by the second collaborative service program, the cross-chain governance smart contract invoke request to the second governance node, wherein the cross-chain governance smart contract invoke request may carry the execution result of the cross-chain interoperation; and sending, by the second collaborative service program, the cross-chain interoperation execution result to the first collaborative service program.

s1108: In response to the cross-chain governance smart contract invoke request, invoke and execute, by the second governance node, the cross-chain governance smart contract and upload the execution result to the governance chain.

s1109: Verify, by the first collaborative service program, the execution result.

The verifying, by the first collaborative service program, the execution result may include the following steps: acquiring, by the first collaborative service program, the execution result uploaded by the first governance node from the governance chain, and comparing the execution result uploaded by the first governance node with a received execution result; indicating that verification succeeds if the execution result uploaded by the first governance node is the same as the received execution result, and feeding, by the first collaborative service program, the execution result back to a first business application; and indicating that verification fails if the execution result uploaded by the first governance node is different from the received execution result.

s1110: Receive the execution result by the first business application.

It can be known from the cross-chain interoperation process between the first business application and the second application subchain shown in FIG. 11 that the cross-chain interoperation process between the first business application and the second application subchain may be achieved through the mutual communication between the first collaborative service program and the first governance node, the mutual communication between the second collaborative service program and the second governance node and the mutual communication between the first collaborative service program and the collaborative service program; and the verifying process in the cross-chain interoperation process is simplified, and the execution efficiency of the cross-chain interoperation between the first business application and the second application subchain is improved based on the permission control capability of the cross-chain collaborative governance system. The first governance node and the second governance node in the governance chain perform control governance on the cross-chain interoperation so that the whole process of the cross-chain interoperation between the first business application and the second application subchain may be recorded on the governance chain, thereby achieving trace-remaining traceability of the whole process of the cross-chain interoperation.

In the embodiments of the present disclosure, after the first application subchain and the second application subchain in the cross-chain alliance have access to the cross-chain collaborative governance system, the first governance node associated with the first application subchain and the second governance node associated with the second application subchain need to be constructed in the governance chain, the first collaborative service program needs to be deployed in the first blockchain network, the second collaborative service program needs to be deployed in the second blockchain network, the first application subchain is arranged in the first blockchain network, and the second application subchain is arranged in the second blockchain network; the communication connection between the first collaborative service program and the second collaborative service program, the communication connection between the first collaborative service program and the first governance node and the communication connection between the second collaborative service program and the second governance node need to be established; and accordingly, the cross-chain interoperation is performed between the first application subchain and the second application subchain based on the mutual communication between the first collaborative service program and the second collaborative service program, and control governance is performed on the cross-chain interoperation between the first application subchain and the second application subchain based on the mutual communication between the first collaborative service program and the first governance node and the mutual communication between the second collaborative service program and the second governance node.

It can be known from the above solution that the cross-chain interoperation between the application subchains (such as the first application subchain and the second application subchain) in the cross-chain alliance is achieved through the mutual communication between the collaborative service programs corresponding to the application subchains, control governance is performed, by the governance nodes in the governance chain, on the cross-chain interoperation between the application subchains (such as the first application subchain and the second application subchain) in the cross-chain alliance, thereby effectively improving the execution efficiency of the cross-chain interoperation between the application chains. Through the smart contract, the recording of cross-chain transaction ledgers is realized (that is, the first governance node in the governance chain uploads the cross-chain interoperation permission application, the cross-chain interoperation service request, and the like to the governance chain, and the second governance node in the governance chain uploads the cross-chain interoperation permission application result, the execution result, and the like to the governance chain) and the confirmation of a transaction final state is realized (that is, the first collaborative service program verifies the cross-chain interoperation execution result), and meanwhile functions such as cross-chain interoperation trace remaining, tracing, abnormality early warning and a final consistency account checking mechanism are provided.

Figure 12:
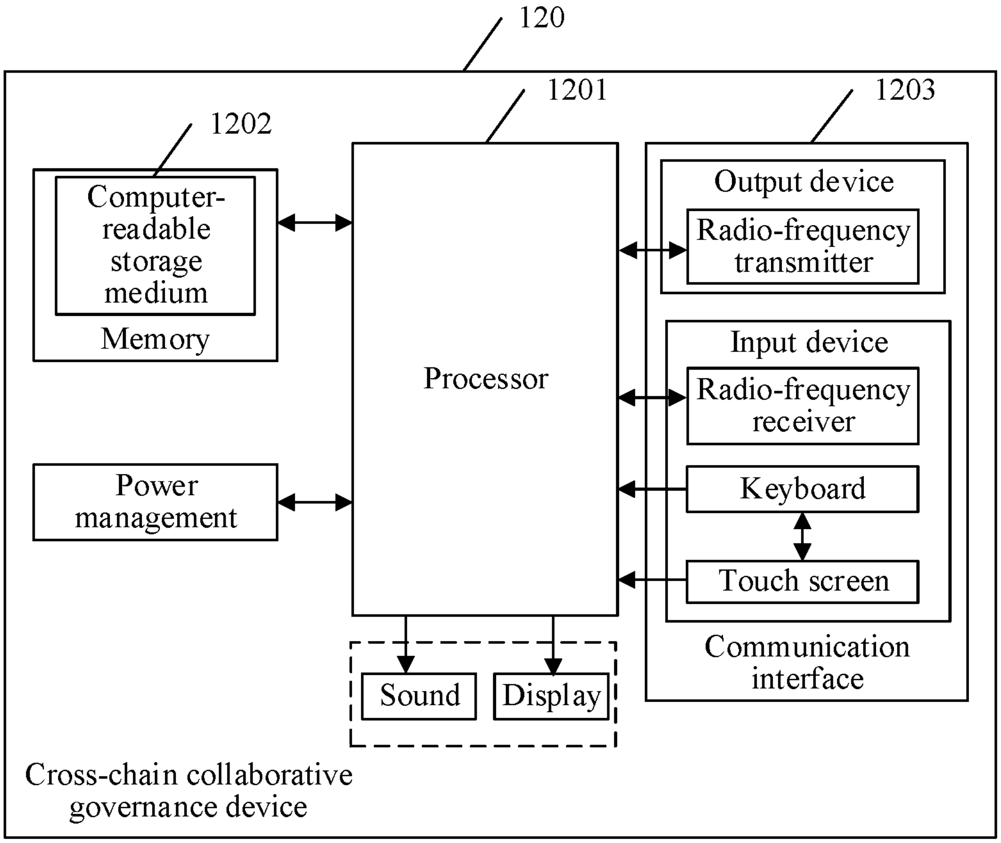
FIG. 12 is a schematic structural diagram of a cross-chain collaborative governance device according to an embodiment of the present disclosure.

Refer to FIG. 12, and FIG. 12 is a schematic structural diagram of a cross-chain collaborative governance device according to an embodiment of the present disclosure. The cross-chain collaborative governance device 120 at least includes a processor 1201, a computer-readable storage medium 1202 and a communication interface 1203. The processor 1201, the computer-readable storage medium 1202 and the communication interface 1203 may be connected through a bus or other manners. The communication interface 1203 may be configured to receive or transmit data. The computer-readable storage medium 1202 may be stored in a memory and is configured to store computer programs of a cross-chain collaborative governance system. That is, the cross-chain collaborative governance system is deployed in the computer-readable storage medium 1202 in the form of computer programs, and the computer programs include computer instructions. The processor 1201 is configured to execute the computer instructions. The processor 1201 (or referred to as a central processing unit (CPU)) is a computing core and a control core of the cross-chain collaborative governance device 120, is suitable for implementing one or more computer instructions, and is specifically suitable for loading and executing the one or more computer instructions to implement a corresponding method procedure or a corresponding function.

The embodiments of the present disclosure further provide a computer-readable storage medium, and the computer-readable storage medium is a storage device in a cross-chain collaborative governance device 120 and is configured to store programs and data. It is to be understood that the computer-readable storage medium 1202 herein may include an internal storage medium of the cross-chain collaborative governance device 120 and certainly may also include an extended storage medium supported by the cross-chain collaborative governance device 120. The computer-readable storage medium provides storage space, and the storage space stores an operating system of the cross-chain collaborative governance device 120. Moreover, one or more computer instructions suitable for the processor 1201 to load and execute is further stored in the memory space. These computer instructions may be one or more computer programs (including program codes). It is to be explained that the computer-readable storage medium 1202 may be a high-speed random access memory (RAM), or a non-volatile memory, such as at least one disk memory. In some embodiments, the computer-readable storage medium may be at least one computer storage medium far away from the foregoing processor 1201.

The computer-readable storage medium 1202 stores the computer programs, and the computer programs include one or more computer instructions. The processor 1201 loads and executes the one or more computer instructions to implement corresponding steps in the embodiments of methods shown in FIG. 5-FIG. 11.

According to an aspect of the present disclosure, a computer program product or a computer program is provided, the computer program product or the computer program including computer instructions, the computer instructions being stored in a computer-readable storage medium. A processor of a computer device (for example, may be the cross-chain collaborative governance device) reads the computer instructions from the computer-readable storage medium and executes the computer instructions to cause the computer device to perform the cross-chain collaborative governance method provided in various example manners.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A cross-chain collaborative governance system, for collaborative service and control governance on cross-chain interoperation between application subchains in a cross-chain alliance, the cross-chain alliance comprising a first application subchain arranged in a first blockchain network and a second application subchain arranged in a second blockchain network, the cross-chain collaborative governance system comprising:

a cross-chain access application layer configured to provide the first application subchain and the second application subchain with access to the cross-chain collaborative governance system;

a credible cross-chain collaborative layer configured to deploy a first collaborative service program in the first blockchain network and a second collaborative service program in the second blockchain network, and establish communication connection between the first collaborative service program and the second collaborative service program that facilitates cross-chain interoperation between the first application subchain and the second application subchain; and a credible cross-chain governance layer configured to operate a governance chain comprising a first governance node associated with the first application subchain and a second governance node associated with the second application subchain, the governance chain comprising a blockchain distinct from the first blockchain network and the second blockchain network, the first governance node corresponding to a management organization of the first application subchain, the second governance node corresponding to a management organization of the second application subchain, the management organizations of the first application subchain and the second application subchain jointly participating in the control governance on the cross-chain interoperation through the governance chain, and establish communication connection between the first collaborative service program and the first governance node and communication connection between the second collaborative service program and the second governance node, and perform control governance on the cross-chain interoperation between the first application subchain and the second application subchain.

2. The system according to claim 1, wherein the first blockchain network comprises a first service device; the deploying, by the credible cross-chain collaborative layer, the first collaborative service program in the first blockchain network comprises:

deploying, by the credible cross-chain collaborative layer, the first collaborative service program in the first service device and indicating the first service device to configure parameters of the first application subchain in the first collaborative service program;

the second blockchain network comprises a second service device; and the deploying, by the credible cross-chain collaborative layer, the second collaborative service program in the second blockchain network comprises: deploying, by the credible cross-chain collaborative layer, the second collaborative service program in the second service device and indicating the second service device to configure parameters of the second application subchain in the second collaborative service program.

3. The system according to claim 1, wherein the first collaborative service program and the second collaborative service program each comprise a cross-chain service interface, a subchain proxy service subprogram and a cross-chain interoperation engine;

the cross-chain service interface is configured to receive a service request of cross-chain interoperation in a blockchain network to which a corresponding application subchain belongs;

the subchain proxy service subprogram is configured to monitor the service request of cross-chain interoperation on the corresponding application subchain; and the cross-chain interoperation engine is configured to execute cross-chain interoperation when the cross-chain service interface receives the service request of cross-chain interoperation in the blockchain network to which the corresponding application subchain belongs, or the subchain proxy service subprogram monitors the service request of cross-chain interoperation on the corresponding application subchain.

4. The system according to claim 1, wherein the credible cross-chain governance layer further comprises governance service, and is further configured to deploy the governance service in the governance chain in a form of a smart contract, open the smart contract to the first governance node and the second governance node.

5. The system according to claim 1, wherein the cross-chain collaborative governance system further comprises a security support layer configured to provide cross-chain security rules for the credible cross-chain collaborative layer to guide the collaborative service performed at the credible cross-chain collaborative layer, and to provide the cross-chain security rules for the credible cross-chain governance layer to guide the control governance performed at the credible cross-chain governance layer.

6. A cross-chain collaborative governance method, applied to a cross-chain collaborative governance system, comprising:

providing a first application subchain and a second application subchain with access to the cross-chain collaborative governance system; the first application subchain being arranged in a first blockchain network and the second application subchain being arranged in a second blockchain network in a cross-chain alliance;

constructing a first governance node associated with the first application subchain and a second governance node associated with the second application subchain in a governance chain, the governance chain comprising a blockchain distinct from the first blockchain network and the second blockchain network, the first governance node corresponding to a management organization of the first application subchain, the second governance node corresponding to a management organization of the second application subchain, the management organizations of the first application subchain and the second application subchain jointly participating in the control governance on the cross-chain interoperation through the governance chain;

deploying a first collaborative service program in the first blockchain network and a second collaborative service program in the second blockchain network;

establishing communication connection between the first collaborative service program and the second collaborative service program, and performing cross-chain interoperation between the first application subchain and the second application subchain;

establishing communication connection between the first collaborative service program and the first governance node and communication connection between the second collaborative service program and the second governance node; and performing control governance on the cross-chain interoperation between the first application subchain and the second application subchain.

7. The method according to claim 6, wherein the governance chain comprises M governance nodes, M being an integer greater than 1, the M governance nodes comprise P Genesis nodes with a management permission for the governance chain, P being a positive integer and being less than or equal to M; the method further comprising:

broadcasting, by a first Genesis node, a joining application of the first application subchain in the governance chain when the first application subchain applies to join a cross-chain alliance, the joining application comprising identity information of the first blockchain network and parameters of the first application subchain, the first Genesis node being one of the P Genesis nodes;

voting, by a governance node in the governance chain, on the joining application; and adding the first application subchain to the cross-chain alliance in response to a vote-through result.

8. The method according to claim 6, wherein the governance chain comprises M governance nodes, M being an integer greater than 1; the M governance nodes comprise P Genesis nodes with a management permission for the governance chain, P being a positive integer and being less than or equal to M; the first blockchain network comprises a first service device, and the second blockchain network comprises a second service device; the deploying the first collaborative service program in the first blockchain network comprises:

issuing, by a second Genesis node, an indication message to the first service device, the indication message comprising a collaborative service program or an address of the collaborative service program; and enabling the first service device to acquire the collaborative service program according to the indication message, and configuring parameters of the first application subchain in the collaborative service program so as to form the first collaborative service program, the second Genesis node being one of the P Genesis nodes; and the deploying the second collaborative service program in the second blockchain network comprises:

issuing, by a third Genesis node, the indication message to the second service device, the indication message comprising the collaborative service program or the address of the collaborative service program; and enabling the second service device to acquire the collaborative service program according to the indication message, and configuring parameters of the second application subchain in the collaborative service program so as to form the second collaborative service program, the third Genesis node being one of the P Genesis nodes.

9. The method according to claim 6, further comprising:

transmitting, by the first collaborative service program, a cross-chain interoperation permission application to the first governance node, the cross-chain interoperation permission application comprising parameters of the second application subchain;

invoking and executing, by the first governance node, a permission application smart contract and uploading the cross-chain interoperation permission application to the governance chain;

acquiring, by the second governance node, the cross-chain interoperation permission application from the governance chain, and transmitting the cross-chain interoperation permission application to the second collaborative service program;

generating, by the second collaborative service program, permission treatment transactions according to the cross-chain interoperation permission application, generating a permission application result according to a treatment result of the permission treatment transactions, and transmitting the permission application result to the second governance node;

invoking and executing, by the second governance node, an authorization governance smart contract and uploading the permission application result to the governance chain; and acquiring, by the first governance node, the permission application result from the governance chain, and transmitting the permission application result to the first collaborative service program.

10. The method according to claim 6, wherein the second collaborative service program comprises a cross-chain interoperation engine, the cross-chain interoperation engine being configured to execute cross-chain interoperation; and the performing the cross-chain interoperation between the first application subchain and the second application subchain comprises:

transmitting, by the first collaborative service program, a service request to the second collaborative service program when the first collaborative service program monitors the service request of cross-chain interoperation on the first application subchain; and verifying, by the second collaborative service program, the service request, and invoking the cross-chain interoperation engine to execute the cross-chain interoperation for the second application subchain, and return an execution result of the cross-chain interoperation to the first collaborative service program when verification passes.

11. The method according to claim 10, wherein the service request comprises a security certificate of the first collaborative service program; and the verifying, by the second collaborative service program, the service request comprises:

verifying, by the second collaborative service program, the security certificate of the first collaborative service program; transmitting, by the second collaborative service program, a security certificate of the second collaborative service program to the first collaborative service program for verification; and determining that service request verification passes when the second collaborative service program verifies that the security certificate of the first collaborative service program passes, and the first collaborative service program verifies that the security certificate of the second collaborative service program passes.

12. The method according to claim 10, wherein the service request comprises parameters of the first application subchain; and the verifying, by the second collaborative service program, the service request comprises:

acquiring, by the second collaborative service program, an authorization list from a governance chain, the authorization list comprising parameters of a plurality of application subchains with a cross-chain interoperation permission; and determining that service request verification passes when the parameters of the first application subchain exist in the authorization list.

13. The method according to claim 10, wherein the performing the control governance on the cross-chain interoperation between the first application subchain and the second application subchain comprises:

transmitting, by the first collaborative service program, the service request to the first governance node based on communication connection between the first collaborative service program and the first governance node to enable the first governance node to invoke and execute a cross-chain governance smart contract and upload the service request to a governance chain; and transmitting, by the second collaborative service program, an execution result to the second governance node based on communication connection between the second collaborative service program and the second governance node to enable the second governance node to invoke and execute the cross-chain governance smart contract and upload the execution result to the governance chain.

14. A non-transitory computer-readable storage medium, comprising a computer program, the computer program, when loaded and executed by a processor, causing the processor to perform:

providing a first application subchain and a second application subchain with access to the cross-chain collaborative governance system; the first application subchain being arranged in a first blockchain network and the second application subchain being arranged in a second blockchain network in a cross-chain alliance;

constructing a first governance node associated with the first application subchain and a second governance node associated with the second application subchain in a governance chain, the governance chain comprising a blockchain distinct from the first blockchain network and the second blockchain network, the first governance node corresponding to a management organization of the first application subchain, the second governance node corresponding to a management organization of the second application subchain, the management organizations of the first application subchain and the second application subchain jointly participating in the control governance on the cross-chain interoperation through the governance chain;

deploying a first collaborative service program in the first blockchain network and a second collaborative service program in the second blockchain network;

establishing communication connection between the first collaborative service program and the second collaborative service program, and performing cross-chain interoperation between the first application subchain and the second application subchain;

establishing communication connection between the first collaborative service program and the first governance node and communication connection between the second collaborative service program and the second governance node; and performing control governance on the cross-chain interoperation between the first application subchain and the second application subchain.

15. The storage medium according to claim 14, wherein the governance chain comprises M governance nodes, M being an integer greater than 1, the M governance nodes comprise P Genesis nodes with a management permission for the governance chain, P being a positive integer and being less than or equal to M; the computer program further cause the processor to perform:

broadcasting, by a first Genesis node, a joining application of the first application subchain in the governance chain when the first application subchain applies to join a cross-chain alliance, the joining application comprising identity information of the first blockchain network and parameters of the first application subchain, the first Genesis node being one of the P Genesis nodes;

voting, by a governance node in the governance chain, on the joining application; and adding the first application subchain to the cross-chain alliance in response to a vote-through result.

16. The storage medium according to claim 14, wherein the governance chain comprises M governance nodes, M being an integer greater than 1; the M governance nodes comprise P Genesis nodes with a management permission for the governance chain, P being a positive integer and being less than or equal to M; the first blockchain network comprises a first service device, and the second blockchain network comprises a second service device; the deploying the first collaborative service program in the first blockchain network comprises:

issuing, by a second Genesis node, an indication message to the first service device, the indication message comprising a collaborative service program or an address of the collaborative service program; and enabling the first service device to acquire the collaborative service program according to the indication message, and configuring parameters of the first application subchain in the collaborative service program so as to form the first collaborative service program, the second Genesis node being one of the P Genesis nodes; and the deploying the second collaborative service program in the second blockchain network comprises:

issuing, by a third Genesis node, the indication message to the second service device, the indication message comprising the collaborative service program or the address of the collaborative service program; and enabling the second service device to acquire the collaborative service program according to the indication message, and configuring parameters of the second application subchain in the collaborative service program so as to form the second collaborative service program, the third Genesis node being one of the P Genesis nodes.

17. The storage medium according to claim 14, further comprising:

transmitting, by the first collaborative service program, a cross-chain interoperation permission application to the first governance node, the cross-chain interoperation permission application comprising parameters of the second application subchain;

invoking and executing, by the first governance node, a permission application smart contract and uploading the cross-chain interoperation permission application to the governance chain;

acquiring, by the second governance node, the cross-chain interoperation permission application from the governance chain, and transmitting the cross-chain interoperation permission application to the second collaborative service program;

generating, by the second collaborative service program, permission treatment transactions according to the cross-chain interoperation permission application, generating a permission application result according to a treatment result of the permission treatment transactions, and transmitting the permission application result to the second governance node;

invoking and executing, by the second governance node, an authorization governance smart contract and uploading the permission application result to the governance chain; and acquiring, by the first governance node, the permission application result from the governance chain, and transmitting the permission application result to the first collaborative service program.

18. The storage medium according to claim 14, wherein the second collaborative service program comprises a cross-chain interoperation engine, the cross-chain interoperation engine being configured to execute cross-chain interoperation; and the performing the cross-chain interoperation between the first application subchain and the second application subchain comprises:

transmitting, by the first collaborative service program, a service request to the second collaborative service program when the first collaborative service program monitors the service request of cross-chain interoperation on the first application subchain; and verifying, by the second collaborative service program, the service request, and invoking the cross-chain interoperation engine to execute the cross-chain interoperation for the second application subchain, and return an execution result of the cross-chain interoperation to the first collaborative service program when verification passes.

19. The storage medium according to claim 18, wherein the service request comprises a security certificate of the first collaborative service program; and the verifying, by the second collaborative service program, the service request comprises:

verifying, by the second collaborative service program, the security certificate of the first collaborative service program; transmitting, by the second collaborative service program, a security certificate of the second collaborative service program to the first collaborative service program for verification; and determining that service request verification passes when the second collaborative service program verifies that the security certificate of the first collaborative service program passes, and the first collaborative service program verifies that the security certificate of the second collaborative service program passes.

20. The storage medium according to claim 18, wherein the service request comprises parameters of the first application subchain; and the verifying, by the second collaborative service program, the service request comprises:

acquiring, by the second collaborative service program, an authorization list from a governance chain, the authorization list comprising parameters of a plurality of application subchains with a cross-chain interoperation permission; and determining that service request verification passes when the parameters of the first application subchain exist in the authorization list.

* * * * *